United States Patent
Hong et al.

(10) Patent No.: US 10,462,709 B2
(45) Date of Patent: Oct. 29, 2019

(54) METHOD FOR CONTROLLING MOBILITY OF TERMINAL, AND DEVICE THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/749,267

(22) PCT Filed: Sep. 22, 2016

(86) PCT No.: PCT/KR2016/010550
§ 371 (c)(1),
(2) Date: Jan. 31, 2018

(87) PCT Pub. No.: WO2017/052206
PCT Pub. Date: Mar. 30, 2017

(65) Prior Publication Data
US 2018/0220336 A1    Aug. 2, 2018

(30) Foreign Application Priority Data

Sep. 23, 2015 (KR) .................. 10-2015-0135016
Sep. 20, 2016 (KR) .................. 10-2016-0119736

(51) Int. Cl.
*H04W 36/00* (2009.01)
*H04W 8/08* (2009.01)
(Continued)

(52) U.S. Cl.
CPC ......... *H04W 36/0016* (2013.01); *H04W 8/08* (2013.01); *H04W 36/0069* (2018.08);
(Continued)

(58) Field of Classification Search
CPC ............. H04W 36/00; H04W 36/0016; H04W 36/0077; H04W 36/08; H04W 36/10; H04W 36/28; H04W 88/06; H04W 88/10
See application file for complete search history.

(56) References Cited

U.S. PATENT DOCUMENTS 9,820,332 B2 * 11/2017 Lee ........................ H04W 16/32
2012/0021747 A1   1/2012 Brandt et al.
(Continued)

FOREIGN PATENT DOCUMENTS

KR    10-2015-0017642 A    2/2015
KR    10-2015-0035283 A    4/2015
(Continued)

*Primary Examiner* — Chi Ho A Lee
(74) *Attorney, Agent, or Firm* — IP Legal Services, LLC

(57) ABSTRACT

Provided are a method and device for controlling mobility, which reduce a delay or service interruption occurring in a handover process of a terminal. The method of a terminal may include receiving an RRC connection reconfiguration message including mobility control information from a master eNB; controlling data transmission to or data reception from a source secondary eNB to be maintained up to a specific point of time on the basis of the mobility control information; and transmitting a random access channel (RACH) for performing a random access procedure to a target secondary eNB.

11 Claims, 14 Drawing Sheets

(51) Int. Cl.
*H04W 36/28* (2009.01)
*H04W 88/06* (2009.01)
*H04W 36/08* (2009.01)
*H04W 74/08* (2009.01)
*H04W 88/10* (2009.01)

(52) U.S. Cl.
CPC ..... *H04W 36/00837* (2018.08); *H04W 36/28* (2013.01); *H04W 88/06* (2013.01); *H04W 36/08* (2013.01); *H04W 74/0833* (2013.01); *H04W 88/10* (2013.01)

(56) References Cited

U.S. PATENT DOCUMENTS

| | | | |
|---|---|---|---|
| 2015/0264562 A1* | 9/2015 | Wu | H04W 12/04 380/270 |
| 2015/0319800 A1 | 11/2015 | Park et al. | |
| 2015/0351139 A1* | 12/2015 | Zhang | H04W 52/0251 370/329 |
| 2016/0212661 A1* | 7/2016 | Basu Mallick | H04L 1/1614 |
| 2016/0316508 A1 | 10/2016 | Hong et al. | |
| 2017/0142770 A1* | 5/2017 | Fu | H04L 1/1614 |
| 2017/0245186 A1* | 8/2017 | Sakurai | H04W 16/32 |
| 2017/0273132 A1 | 9/2017 | Park et al. | |

FOREIGN PATENT DOCUMENTS

| | | | |
|---|---|---|---|
| KR | 10-2015-0051091 A | | 5/2015 |
| KR | 10-2015-0086171 A | | 7/2015 |
| WO | 2015/009043 A1 | | 1/2015 |
| WO | 2015/020478 A1 | | 2/2015 |
| WO | 2015/064972 A1 | | 5/2015 |

\* cited by examiner

METHOD FOR CONTROLLING MOBILITY OF TERMINAL, AND DEVICE THEREFOR

CROSS REFERENCE TO RELATED APPLICATIONS

This application is a National Stage Patent Application of PCT International Patent Application No. PCT/KR2016/010550 (filed on Sep. 22, 2016) under 35 U.S.C. § 371, which claims priority to Korean Patent Application Nos. 10-2015-0135016 (filed on Sep. 23, 2015), and 10-2016-0119736 (filed on Sep. 20, 2016), the teachings of which are incorporated herein in their entireties by reference.

TECHNICAL FIELD

The present disclosure relates to a method and device for controlling the mobility of a user terminal or a terminal. More particularly, the present disclosure relates to a mobility controlling method and device for reducing service interruptions and service delays occurring during a handover process of a terminal.

BACKGROUND ART

Due to advances in communications systems, various types of wireless terminals have been introduced to consumers. Current mobile communications systems have adapted techniques of the $3^{rd}$ generation partnership project (3GPP) family, such as long term evolution (LTE) and LTE-Advanced. Such mobile communication systems are high-speed and high-capacity communications systems capable of providing a data service for transmitting various types of data, such as images and wireless data, as well as voice-centric services.

For such high-speed and high-capacity communications systems, technology has been required for enhancing capability of a terminal using small cells. For using small cells, technology has been also required for enabling the terminal to configure connections to a plurality of base stations including the small cells. In this regard, there have been many researches conducted for developing dual connectivity (DC) that aggregates one or more cells controlled by two or more base stations. Further, there also have been many researches for processing a large amount of data at a high speech through carrier aggregation (CA) of aggregating one or more cells.

Since a user travels with a terminal, the terminal may get out of an area of a current base station (e.g., cell) and get into a new area of another base station. In this case, it is required to perform a handover procedure for enabling the terminal to transmit and receive data. The handover procedure refers to a procedure enabling the terminal to seamlessly have a data transmission and reception service when the terminal migrates from a first base station to a second base station.

In the related-art handover procedure, however, the terminal must perform a random access procedure to resume data transmission and reception, due to movement from one base station (e.g., cell) to another. In this case, data transmissions may be interrupted for a significant length of time. In addition, in the-related art, while a terminal is releasing a secondary base station (SeNB) to perform a SeNB change, the data transmission interruption may continue for a significant length of time. Such defects may degrade the reliability and the service quality.

DISCLOSURE

Technical Problem

Accordingly, the present disclosure has been made in consideration of the above-described problems occurring in the related art, and the present disclosure proposes a method and device for reducing delays or interruptions in data transmission and reception, caused by terminal movement from one base station (e.g., cell coverage area) to another.

Also provided are a method and device for preventing service delays caused by frequent handovers or frequent changes in secondary base stations, even in a small cell deployment environment or in a case in which a terminal is moving at high speed.

Technical Solution

According to an embodiment proposed to solve the foregoing problem, provided is a method of performing a mobility control operation by a terminal. The method may include: receiving an RRC connection reconfiguration message including mobility control information from a master base station (master eNB); controlling data transmission and/or reception to and/or from a source secondary base station to be maintained to a specific point in time, based on the mobility control information; and transmitting a random access channel (RACH) regarding a random access procedure on a target secondary base station.

According to an embodiment of the present disclosure, provided is a method of performing a mobility control operation of a terminal by a source secondary base station. The method may include: receiving secondary base station release request information from a master base station; maintaining an operation of transmitting and/or receiving data to and/or from a terminal to a specific point in time; and releasing terminal context when the specific point in time has passed.

According to an embodiment of the present disclosure, provided is a method of performing a mobility control operation of a terminal by a target secondary base station. The method may include: receiving secondary base station addition request information from a master base station; transmitting secondary base station addition request acknowledgement information to the master base station; and receiving an RACH regarding a random access procedure from the terminal.

According to an embodiment of the present disclosure, provided is a terminal performing a mobility control operation. The terminal may include: a receiver receiving an RRC connection reconfiguration message including mobility control information from a master base station; a controller controlling data transmission and/or reception to and/or from a source secondary base station to be maintained to a specific point in time, based on the mobility control information; and a transmitter transmitting an RACH regarding a random access procedure on a target secondary base station.

According to an embodiment of the present disclosure, provided is a source secondary base station performing a mobility control operation of a terminal. The source secondary base station may include: a receiver receiving secondary base station release request information from a master base station; and a controller maintaining an operation of transmitting and/or receiving data to and/or from a terminal to a specific point in time and releasing terminal context when the specific point in time has passed.

According to an embodiment of the present disclosure, provided is a target secondary base station performing a mobility control operation of a terminal. The target secondary base station may include: a receiver receiving secondary base station addition request information from a master base station; and a transmitter transmitting secondary base station addition request acknowledgement information to the master base station. The transmitter further receives an RACH regarding a random access procedure from the terminal.

Advantageous Effects

According to embodiments, it is possible to reduce delays or interruptions in data transmission and/or data reception even when a cell or a base station is changed.

In addition, it is possible to prevent service delays, caused by frequent handovers or secondary base station changes, even in a small cell deployment environment or when a terminal moves at a high speed. Accordingly, it is possible to improve quality of communication service.

MODE FOR INVENTION

Figure 1:
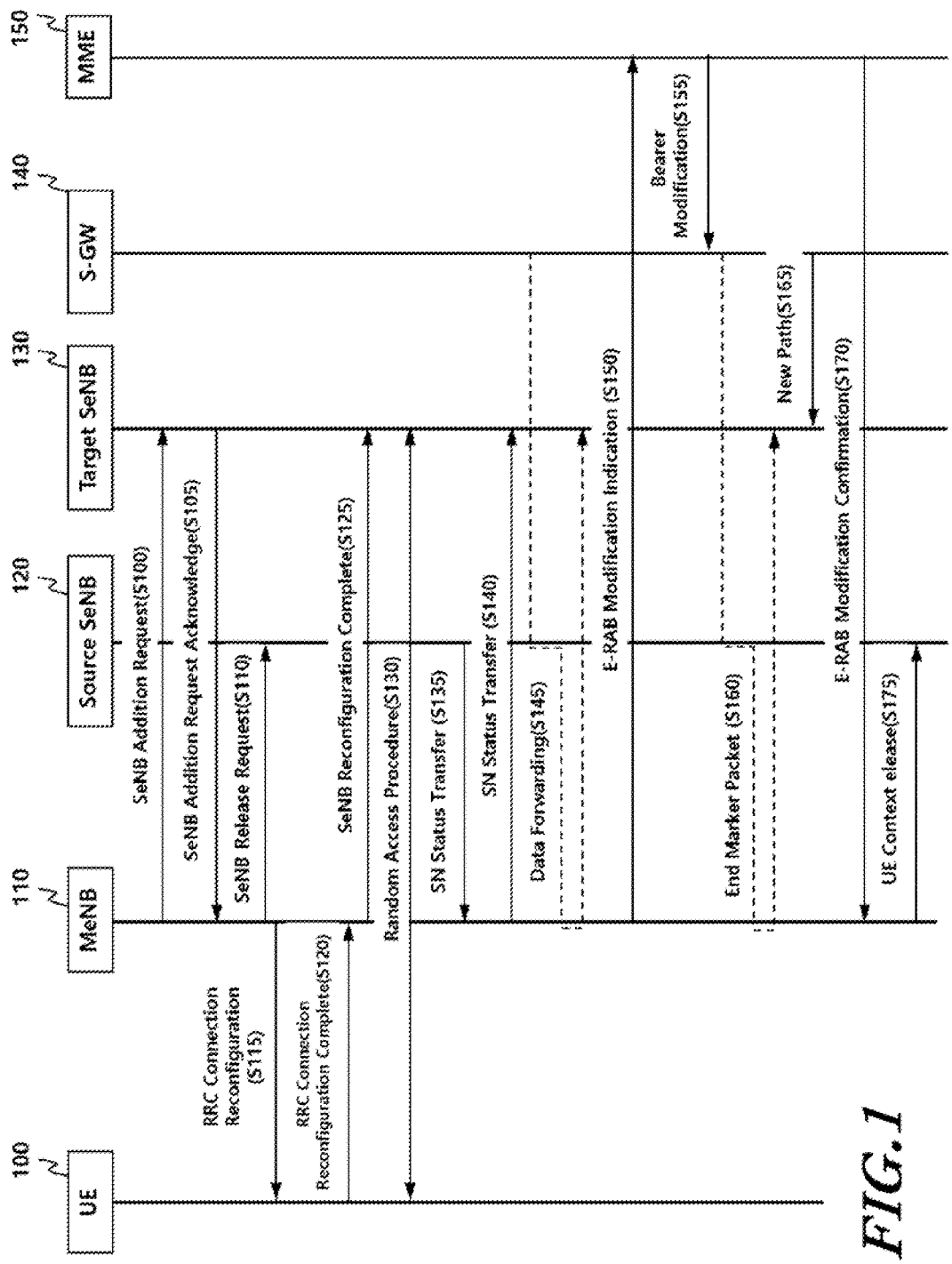
FIG. 1 is a signal diagram illustrating a related-art procedure for changing a secondary base station (SeNB)

Hereinafter, specific embodiments of the present disclosure will be described in detail with reference to illustrative drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Herein, machine-type communications (MTC) terminals or MTC user equipment (UE) may refer to UEs supporting low cost (or low complexity), UE supporting coverage enhancement, or the like. Herein, MTC UEs may refer to UEs defined to belong to a specific category for supporting low cost (or low complexity) and/or coverage enhancement.

In this specification, the MTC UE may refer to newly-defined 3GPP Release13 low cost (or low complexity) UE category/type performing MTC-related operations on the basis of long-term evolution (LTE). Alternatively, the MTC UE may refer to a UE category/type defined in the existing 3GPP Release12 or previous versions that support improved coverage, compared to conventional LTE coverage or support low-power consumption or a newly-defined Release13 low cost (or low complexity) UE category/type.

Wireless communications systems according to the present disclosure are widely deployed to provide a range of communications services, including voice and packet data. Wireless communications systems include user equipment devices (UEs) and base stations (BSs) or evolved node Bs (eNBs). As used in the specification, the term "user equipment" should be interpreted as having a comprehensive meaning indicating a wireless communications user equipment, including not only user equipment used in wideband code division multiple access (WCDMA), long-term evolution (LTE), high-speed packet access (HSPA), and the like, but also all of a mobile station (MS), a user terminal (UT), a subscriber station (SS), a wireless device, and the like, used in the global system for mobile communications (GSM).

A base station or cell typically refers to a station that communicates with user equipment, and may also be referred to using other terms, such as a node B, an eNB, a sector, a site, a base transceiver system (BTS), an access point (AP), a relay node, a remote ratio head (RRH), a radio unit (RU), a small cell, or the like.

Herein, the base station or cell should be interpreted as being a comprehensive term indicating a partial area or function covered by a base station controller (BSC) in CDMA, a node B in WCDMA, an eNB or a sector (or site) in LTE, or the like. In addition, the base station or cell comprehensively indicates a variety of coverage areas, such as a mega cell, a macro cell, a microcell, a picocell, a femtocell, and communications ranges of a relay node, an RRH, an RU, and a small cell.

A variety of cells as stated above are controlled by base stations, respectively, which may be interpreted in two senses. Each of the base stations i) may be an apparatus itself that provides a megacell, a macrocell, a microcell, a picocell, a femtocell, or a small cell in relation to a wireless communications area, or ii) may indicate the wireless communications area itself. In i), entire apparatuses providing wireless areas, controlled by the same entity, or entire apparatuses interacting with one another to form a wireless area in a coordinated manner may refer to base stations. An eNB, an RRH, an antenna, an RU, a low power node (LPN), a point, a transceiver point, a transmission point, a reception point, and the like are used as embodiments of the base station, depending on the configuration of the wireless area. In ii), the wireless area itself in which a signal is received or transmitted may refer to a base station, in terms of a user or an adjacent base station.

Thus, the megacell, the macrocell, the microcell, the picocell, the femtocell, the small cell, the RRH, the antenna, the RU, the LPN, the point, the eNB, the transceiver point, the transmission point, and the reception point collectively refer to the base station.

Herein, the UE and the base station comprehensively refer to two types of transmission/reception entities for realizing technologies or technical concepts described herein and are not limited by terms or words that are explicitly defined. The UE and the base station are comprehensively used as two (uplink or downlink) transmission/reception entities for realizing technologies or technical concepts described herein and are not limited by terms or words that are explicitly defined. Here, the term "uplink (UL)" relates to data transmission/reception in which data is transmitted from the UE to the base station, whereas the term "downlink (DL)" relates to data transmission/reception in which data is transmitted from the base station to the UE.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. An exemplary embodiment of the present disclosure is applicable for the allocation of resources in asynchronous wireless communications evolving into LTE and LTE-Advanced through GSM, WCDMA, and high-speed packet access (HSPA) and synchronous wireless communications evolving into CDMA, CDMA-2000, and ultra-mobile broadband (UMB). The present disclosure should not be interpreted as being limited or restricted to a specific field of wireless communications and should be interpreted as covering all technical fields to which the concept of the present disclosure is applicable.

Uplink (UL) transmissions and downlink (DL) transmissions may employ time division duplexing (TDD) in which transmission is performed at different fractions of time or frequency division duplexing (FDD) in which a transmission is performed at different frequencies.

In addition, a system such as LTE or LTE-Advanced forms standards by forming a UL and a DL, based on a single carrier wave or a pair of carrier waves. The UL and the DL transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, the UL and the DL are constituted of a data channel, such as a physical downlink shared channel (PDSCH) or a physical uplink shared channel (PUSCH), to transmit data.

In addition, control information can be transmitted using an enhanced or extended PDCCH (EPDCCH).

Herein, the cell may refer to coverage of a signal transmitted from a transmission point or a transmission/reception point, a component carrier having the coverage of the signal transmitted from the transmission point or the transmission/reception point, or the transmission point or the transmission/reception point.

The wireless communications system to which embodiments are applied may be a coordinated multi-point transmission/reception (CoMP) system, in which two or more transmission/reception points transmit a signal in a coordinated manner, a coordinated multi-antenna transmission system, or a coordinated multi-cell communications system. The CoMP system may include at least two multi-transmission/reception points and user terminals.

The multi-transmission/reception points may be a base station or a macrocell (hereinafter referred to as an "eNB") and at least one RRH connected to the eNB via a fiber optic cable or an optical fiber to be controlled by wires. The RRH has high transmission power, or has low transmission power within the area of the macrocell.

Hereinafter, the DL refers to communications from each multi-transmission/reception point to a UE or a path for such communications. The UL refers to communications from the UE to the multi-transmission/reception point or a path for such communications. In the DL, a transmitter may be a portion of the multi-transmission/reception point, and a receiver may be a portion of the UE. In the UL, the transmitter may be a portion of the UE, and the receiver may be a portion of the multi-transmission/reception point.

Hereinafter, transmitting/receiving a signal via a channel, such as the PUCCH, PUSCH, PDCCH, EPDCCH, or physical PDSCH, may also be described as "transmitting/receiving a PUCCH, PUSCH, PDCCH, EPDCCH, or PDSCH."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter may indicate the PDCCH or the EPDCCH, or may be used in the sense of including both the PDCCH and the EPDCCH.

The EPDCCH may be applied as an embodiment to the portion, which is described as the PDCCH for convenience of description, and the PDCCH may be applied as an embodiment to the portion, which his described as the EPDCCH for convenience of description.

In addition, higher layer signaling described hereinafter includes radio resource control (RRC) signaling to transmit RRC information including an RRC parameter.

The eNB performs DL transmission to UEs. The eNB can transmit a physical downlink shared channel (PDSCH), which is a main channel for unicast transmissions, and a physical downlink control channel (PDCCH), on which downlink control information (DCI), such as scheduling necessary for the reception of the PDSCH, and scheduling approval information for transmissions on a UL data channel (e.g. a physical uplink shared channel (PUSCH)) are transmitted. Hereinafter, the transmission of a signal on each channel will be described as the transmission of the corresponding channel.

Herein, when a user equipment device (UE) and a base station (eNB) establish an RRC connection, a cell acting as a basis of handover will be referred to as a primary cell (PCell). An eNB providing additional radio resources to the UE, separately from a master eNB (MeNB), when the UE configures dual connectivity with the eNB, will be referred to as a secondary eNB (SeNB). In addition, a cell providing an entirety or a portion of functions of the PCell, among cells controlled by the SeNB, will be referred to as a primary secondary cell (PSCell). Thus, when the UE configures carrier aggregation (CA) via a plurality of cells controlled by a single eNB, a single PCell may be present. Alternatively, when the UE configures dual connectivity with two eNBs, one of cells controlled by the MeNB is established as a PCell, while one of cells controlled by the SeNB is established as a PSCell. In addition, in the case of dual connectivity, cells controlled by the MeNB will be referred to as (cells of) a master cell group (MCG), while cells controlled by the SeNB will be referred to as (cells of) a secondary cell group (SCG).

In addition, when an SeNB, currently configuring dual connectivity with the UE but supposed to be released due to an SeNB change procedure, will be referred to as a source SeNB. An SeNB, which is supposed to be newly added to configure dual connectivity, will be referred to as a target SeNB.

The above-stated terms are given merely for convenience of description but should not be construed as being restrictive.

Embodiments of the present disclosure relate to a method and device for reducing delays in data transmissions and receptions when the UE changes a current SeNB with another SeNB in a handover or dual connectivity environment. Accordingly, the handover procedure, as well as the SeNB change procedure, will be briefly described.

According to 3GPP E-UTRAN handover technology, a target eNB prepares for handover, in response to a handover request message from a source eNB. The target eNB generates an RRC message to be transferred to the UE for the implementation of handover. For example, the target eNB generates an RRC connection reconfiguration message including mobility control information. The target eNB sends a handover request acknowledgement message to the source eNB.

The handover request acknowledgement message includes a container carrying the RRC message to be transferred to the UE for the implementation of handover. The corresponding container includes a new a cell radio network temporary identifier (C-RNTI), a target eNB security algorithm identifier, a dedicated random access channel (RACH) preamble, other parameters, and the like. The source eNB performs integrity protection and ciphering necessary for the RRC message.

After the RRC connection reconfiguration message, including the mobility control information, is received, the UE performs synchronization with the target eNB. Then, the UE accesses a target cell via an RACH.

The UE induces a specific key for the target eNB, and configures a selected security algorithm to be used in the target cell. This will be described in more detail as follows.

After the RRC connection reconfiguration message, including the mobility control information, is received, when a carrier frequency is included in the RRC connection reconfiguration message, the UE considers the target PCell as one of frequencies indicated by the carrier frequency having a physical indicator indicated by a target physical cell ID (targetPhysCellId).

Otherwise, the UE considers the target PCell as one of frequencies of the source PCell having a physical cell identifier indicated by a target physical cell ID.

The UE starts synchronization with the DL of the target PCell. The UE resets an MCG media access control (MAC), and if configured, an SCG MAC. The UE reestablishes packet data convergence protocol (PDCP) regarding all established radio bearers (RBs). The UE reestablishes an MCG radio link control (RLC), and if configured, an SCG RLC, regarding all established RBs.

The UE is configured to consider that an SCell(s), if configured, may be deactivated in a lower layer. The UE applies a new UE identity value to the C-RNTI. For transmission, the UE submits an RRC connection reconfiguration complete message to the lower layer.

When the RRC connection reconfiguration message including the mobility control information is received, the UE directly disconnects the connection to the source cell. Afterwards, the UE performs a random access to the target cell by transmitting the RACH to the target cell for UL synchronization.

The target eNB responds with UL allocation and timing advance.

When the UE successfully accesses the target cell, the UE sends an RRC connection reconfiguration complete message (C-RNTI), indicating the completion of the handover for the UL, to the target eNB, together with a UL buffer status report (BSR), so that the handover is verified. The target eNB verifies the C-RNTI, included in the received RRC connection reconfiguration complete message. The target eNB starts sending data to the UE.

As described above, according to related-art E-UTRAN technology, handover must be performed by the random access, due to a cell change. After the access of the UE to the target cell, an interruption in data transmission may occur in the UE before a random access attempt is detected. For example, when the source eNB transfers the RRC connection reconfiguration message, including the mobility control information, to the UE or the UE receives the RRC connection reconfiguration message, including the mobility control information, the connection between the UE and the source eNB is directly disconnected. That is, the transmission and/or reception of data between the UE and the source eNB is terminated.

An increase in handover interruption time on an LTE network may have an adverse effect on user experience. For example, it is known that, in more than half of such cases, the handover interruption time on the LTE network exceeds 50 ms. It is necessary to reduce such delays in order to provide better quality.

The above-described problem of service interruption during the handover procedure may occur not only during handover but also during the SeNB change procedure of dual connectivity.

FIG. 1 is a signal diagram illustrating a SeNB change procedure. With reference to FIG. 1, respective steps of the SeNB change procedure will be described.

In S100, an MeNB 110 requests that a target SeNB130 allocates resources to a UE 100 in an SeNB addition preparation procedure. In S105, the target SeNB130 transmits an acknowledgement response regarding the SeNB addition request to the MeNB 110. When data forwarding is necessary, the target SeNB 130 provides a forwarding address to the MeNB 110.

When the target SeNB 130 successfully completes the resource allocation, the MeNB 110 initiates releasing resources of a source SeNB120 in S110. When it is necessary to perform data forwarding, the MeNB 110 transfers a data forwarding address to the source SeNB 120. Upon the reception of an SeNB release request message, the source SeNB 120 interrupts providing user data to the UE 100. In addition, data forwarding is initiated, if applicable.

In S115, the MeNB 110 directs an RRC connection reconfiguration message to the UE 100. The RRC connection reconfiguration message includes SCG mobility control information (mobilityControlInfoSCG) to indicate SeNB change. In S120, the UE 100 transmits an RRC connection reconfiguration complete message to the MeNB 110.

When the RRC connection reconfiguration procedure is successfully completed, the MeNB 110 notifies the successful completion to the target SeNB 130 in S125.

In S130, the UE 100 synchronizes with the target SeNB 130. When the RRC connection reconfiguration message, including the SCG mobility control information, is received, the UE 100 performs synchronization with the target SeNB 130. Then, the UE 100 accesses a target cell via an RACH.

In S135, the source SeNB 120 transfers a sequence number (SN) status to the MeNB 110, as required. In S140, the MeNB 110 transfers the received SN status to the SeNB 130.

Data forwarding from the source SeNB 120 occurs for E-RABs configured to have an SCG bearer option. This may be initiated when (as early as) the source SeNB receives the SeNB release request message from the MeNB.

When one of bearer contexts is configured in the source SeNB 120 to have the SCG bearer option, path update is triggered by the MeNB 110. Steps S145 to S147 may be performed for data forwarding.

When a UE context release message is received, the source SeNB 120 releases radio and control plane resources associated with UE contexts in S175.

As described above with reference to FIG. 1, after the MeNB 110 initiated releasing the resources of the source SeNB 120 in step S110, data transmission via the SeNB is interrupted until the UE 100 is synchronized with the target SeNB 130 in step S130. Such operation significantly reduces the user data transmission rate and it is difficult to provide a service during the SeNB change. This problem may become more severe in a new radio access technology (RAT) environment after 3GPP Release-14.

As described above, in the related art, a random access must be performed for handover of changing a cell. It causes interruption in data transmissions for a significant length of time. In addition, in the related art, during the release of the SeNB for the SeNB change, the data transmission interruption may continue for a significant length of time.

Exemplary embodiments of the present disclosure proposed to solve such problems are intended to reduce interruptions in the transmission of data that would be caused by a cell change or an eNB change. Hereinafter, specific embodiments for reducing interruptions in the transmission and/or reception of data during the SeNB change procedure will be described with reference to the drawings.

First Embodiment: Bearer Change After Random Access

Figure 2:
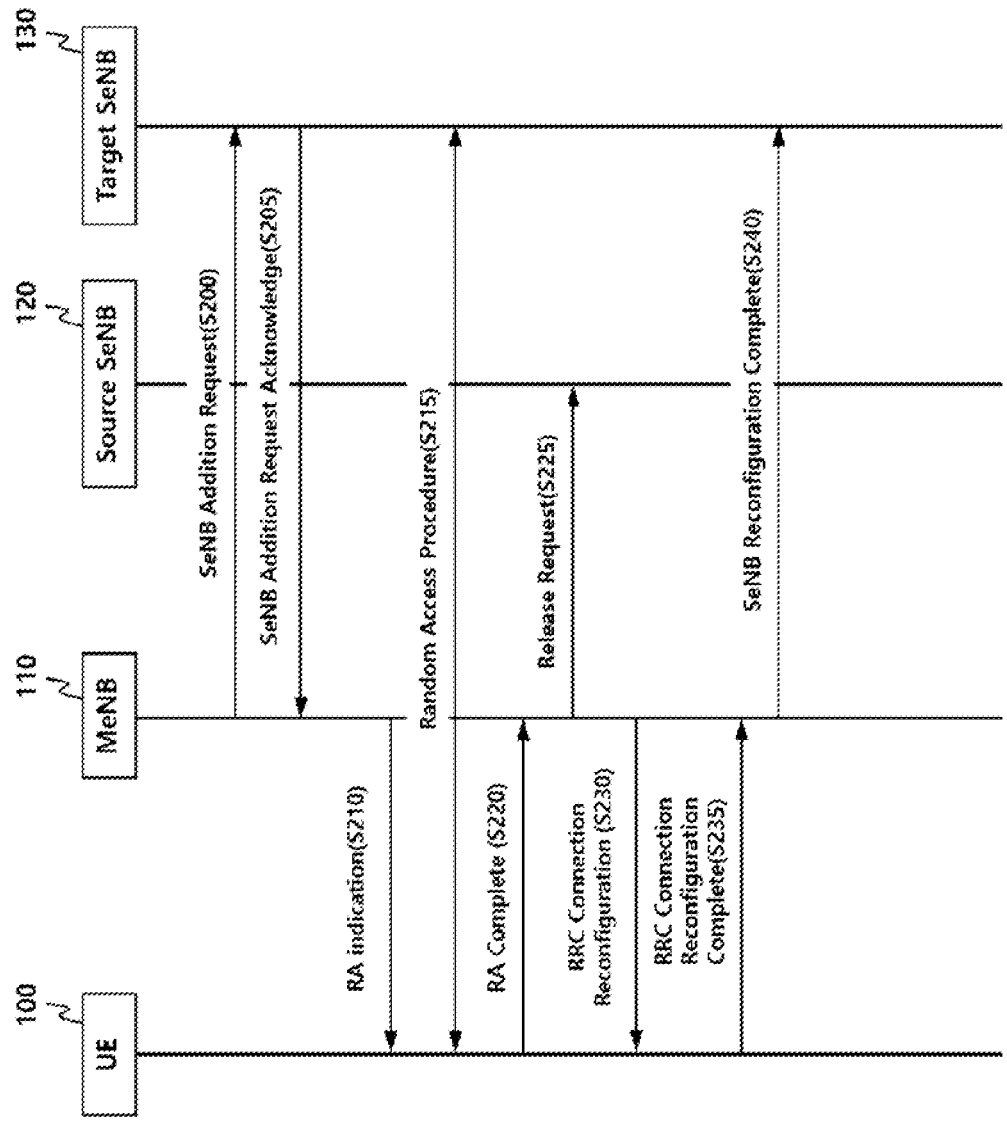
FIG. 2 illustrates an exemplary SeNB change procedure according to a first embodiment.

FIG. 2 illustrates an exemplary SeNB change procedure according to a first embodiment. Hereinafter, respective steps of the procedure will be described in detail.

Referring to FIG. 2, in S200, the MeNB 110 sends a request message to the target SeNB 130 in an SeNB addition preparation procedure, requesting that the target SeNB 130 allocate resources to the UE 100. When data forwarding is necessary, the target SeNB 130 provides a forwarding address to the MeNB 110. In S205, the target SeNB 130 provides resource allocation for the UE 100 in the addition preparation procedure.

When the target SeNB 130 successfully completes the resource allocation, the MeNB 110 transmits indication information to the UE 100 to indicate that the UE 100 should perform a random access triggered by the target SeNB 130 in order to synchronize with the radio resource configuration of the target SeNB 130 in S210.

For example, information indicating a random access to the target SeNB 130 may include information regarding a dedicated RACH preamble UE identifier (rach-ConfigDedicated, ue-IdentitySCG) of the target SeNB 130, such that the UE 100 performs a random access procedure on the target SeNB 130 and synchronizes with a UL of the target SeNB 130.

For another example, the information indicating a random access to the target SeNB 130 may include information regarding a dedicated RACH preamble UE identifier (rach-ConfigDedicated, ue-IdentitySCG) allocated to SeNB mobility control information (MobilityControlInfoSCG) on an RRC message by the target SeNB 130, such that the UE 100 performs a random access procedure on the target SeNB 130 and synchronizes with the UL of the target SeNB 130. When a predetermined number of consecutive attempts for the random access procedure have failed, a MAC layer reports failure information to an RRC layer. The RRC layer interrupts the ongoing random access procedure and notifies the eNB of the failure information. Alternatively, the MAC layer may directly notify the eNB of the failure information.

For further another example, the information indicating a random access to the target SeNB 130 may be transmitted via a MAC control element (CE) for rapid signaling. The random access procedure and the maintenance of timing alignment are provided by the MAC layer. Thus, it may be configured such that signaling is provided at a MAC level in order to minimize interruptions. When a predetermined number of consecutive attempts for the random access procedure have failed, the MAC layer may notify the eNB of the failure via the MAC CE or may report the failure to the RRC layer to notify the eNB of the failure.

For another example, the information indicating a random access to the target SeNB 130 may be transmitted via a PDCCH to enable rapid signaling. When a predetermined number of consecutive attempts for the random access procedure have failed, the MAC layer may notify the eNB of the failure via the MAC CE or may report the failure to the RRC layer to notify the eNB of the failure.

In S215, the UE 100 synchronizes with the target SeNB 130. The UE 100 may synchronize with the target SeNB 130 in the random access procedure.

In S220, the UE 100 may notify the MeNB 110 of the completion of the random access procedure.

When the random access procedure is successfully completed, the MeNB 110 notifies the source SeNB 120 of the successful completion in S225. For example, the MeNB 110 initiates releasing resources of the source SeNB120. When data forwarding is necessary, the MeNB 110 transfers a data forwarding address to the source SeNB 120. Reception of an SeNB release request message may trigger an interruption in the operation of the source SeNB 120 providing user data to the UE 100. Initiation of data forwarding may be triggered, if applicable.

In S230, the MeNB 110 triggers the UE 100 to apply the new configuration. In this regard, the MeNB 110 indicates an RRC connection reconfiguration message to the UE 100.

In S235, the UE 100 transmits an RRC connection reconfiguration complete message to the MeNB 110.

When the RRC connection reconfiguration procedure is successfully completed, the MeNB 110 notifies the target SeNB 130 of the successful completion in S240.

As illustrated in FIG. 2, after the UE 100 completed the random access procedure on the target SeNB 130, the connection between the source SeNB 120 and the UE 100 is disconnected. This may consequently reduce excessive data interruptions in the UE 100.

Figure 3:
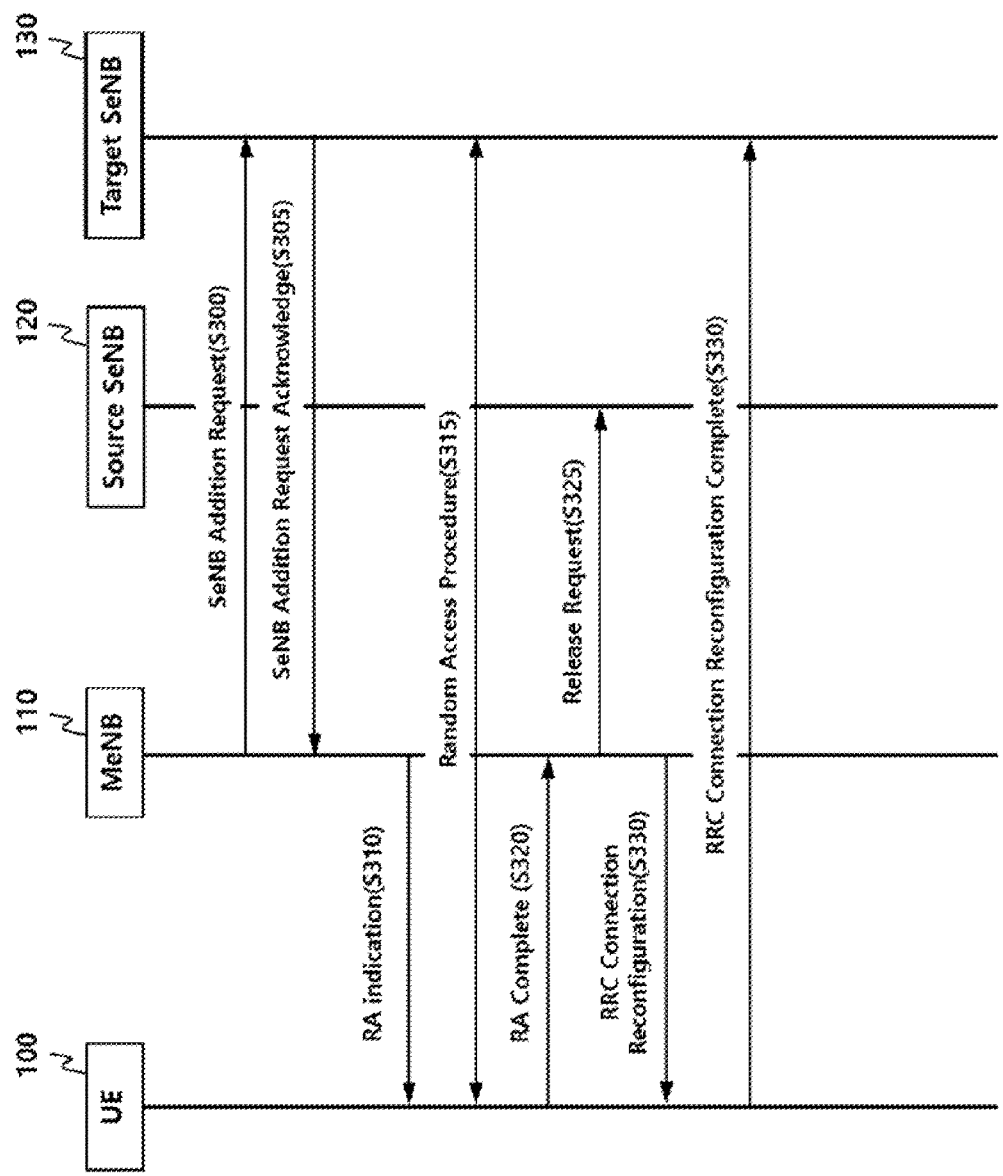
FIG. 3 illustrates another exemplary SeNB change procedure according to the first embodiment.

FIG. 3 illustrates another exemplary SeNB change procedure according to the first embodiment.

Referring to FIG. 3, steps S300 to S330 may be performed in the same manner as foregoing steps S200 to S230. Thus, descriptions of steps S300 to S330 will be omitted. In S330, the MeNB 110 triggers the UE 100 to apply the new configuration.

Afterwards, in S330, the UE 100 may transmit an RRC connection reconfiguration complete message directly to the target SeNB 130, unlike the procedure of FIG. 2. Through the RRC connection reconfiguration complete message, the target SeNB 130 may be directly notified by the UE 100 whether or not the RRC connection reconfiguration procedure has been successfully performed without receiving the message transmitted from the MeNB 110.

Figure 4:
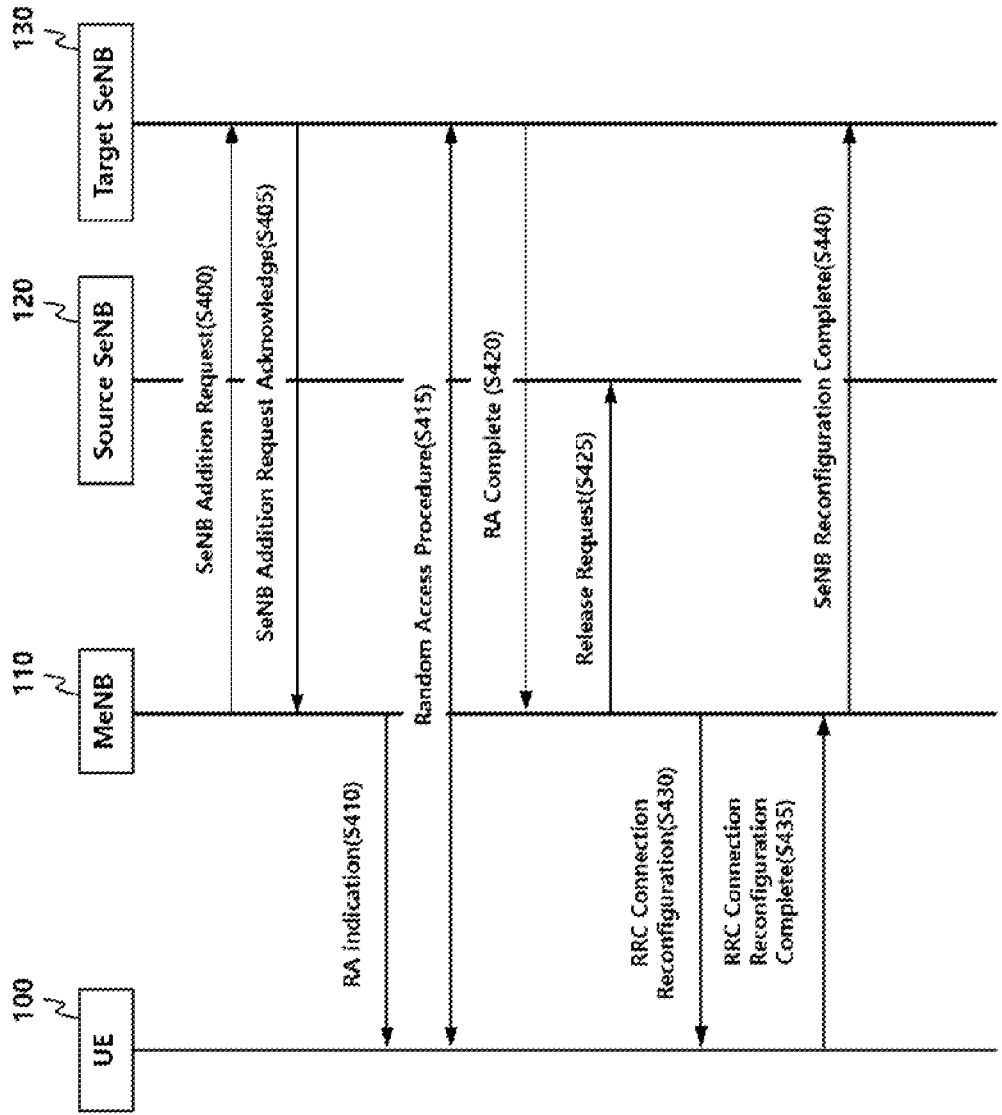
FIG. 4 illustrates a further exemplary SeNB change procedure according to the first embodiment.

FIG. 4 illustrates a further exemplary SeNB change procedure according to the first embodiment.

Referring to FIG. 4, in S400, the MeNB 110 sends a request message to the target SeNB 130 in an SeNB addition preparation procedure, requesting that the target SeNB 130 allocate resources to the UE 100. When data forwarding is necessary, the target SeNB 130 provides a forwarding address to the MeNB 110. In S405, the target SeNB 130 provides resource allocation for the UE 100 in the addition preparation procedure.

When the resource allocation by the target SeNB 130 is successfully completed, the MeNB 110 transmits indication information to the UE 100 in S410 to indicate that the UE 100 should perform a random access triggered by the target SeNB 130 in order to synchronize with the radio resource configuration of the target SeNB 130.

For example, information indicating a random access to the target SeNB 130 may include information regarding a dedicated RACH preamble UE identifier (rach-ConfigDedicated, ue-IdentitySCG) of the target SeNB 130, such that the UE 100 performs a random access procedure on the target SeNB 130 and synchronizes with a UL of the target SeNB 130.

For another example, the information indicating a random access to the target SeNB 130 may include information regarding a dedicated RACH preamble UE identifier (rach-ConfigDedicated, ue-IdentitySCG) allocated to SeNB mobility control information (MobilityControlInfoSCG) on an RRC message by the target SeNB 130, such that the UE 100 performs a random access procedure on the target SeNB 130 and synchronizes with the UL of the target SeNB 130. When a predetermined number of consecutive attempts for the random access procedure have failed, a MAC layer reports failure information to an RRC layer. The RRC layer interrupts the ongoing random access procedure and notifies the eNB of the failure information. Alternatively, the MAC layer may directly notify the eNB of the failure information.

For further another example, the information indicating a random access to the target SeNB 130 may be transmitted via a MAC CE to enable rapid signaling. The random access procedure and the maintenance of timing alignment are provided by the MAC layer. Thus, it may be configured such that signaling is provided at a MAC level in order to minimize interruptions. When a predetermined number of consecutive attempts for the random access procedure have failed, the MAC layer may notify the eNB of the failure via the MAC CE or may report the failure to the RRC layer to notify the eNB of the failure.

For another example, the information indicating a random access to the target SeNB 130 may be transmitted via a PDCCH for rapid signaling. When a predetermined number of consecutive attempts for the random access procedure have failed, the MAC layer may notify the eNB of the failure via the MAC CE or may report the failure to the RRC layer to notify the eNB of the failure.

In S415, the UE 100 synchronizes with the target SeNB 130. The UE 100 may synchronize with the target SeNB 130 in the random access procedure.

In S420, the target SeNB 130 may notify the MeNB 110 of the completion of the random access procedure. That is, the target SeNB 130, in place of the UE 100, may directly notify the MeNB 110 that the random access procedure between the UE 100 and the target SeNB 130 has been completed.

When the random access procedure is successfully completed, the MeNB 110 notifies the source SeNB 120 of the successful completion in S425. For example, the MeNB 110 initiates releasing resources of the source SeNB120. When data forwarding is necessary, the MeNB 110 transfers a data forwarding address to the source SeNB 120. Reception of an SeNB release request message may trigger an interruption in the operation of the source SeNB 120 providing user data to the UE 100. Initiation of data forwarding may be triggered, if applicable.

In S430, the MeNB 110 triggers the UE 100 to apply the new configuration. In this regard, the MeNB 110 indicates an RRC connection reconfiguration message to the UE 100.

In S435, the UE 100 transmits an RRC connection reconfiguration complete message to the MeNB 110.

When the RRC connection reconfiguration procedure is successfully completed, the MeNB 110 notifies the target SeNB 130 of the successful completion in S440.

As illustrated in FIG. 4, after the UE 100 completed the random access procedure on the target SeNB 130, the connection between the source SeNB 120 and the UE 100 is disconnected. This may consequently reduce excessive data interruptions in the UE 100.

Figure 5:
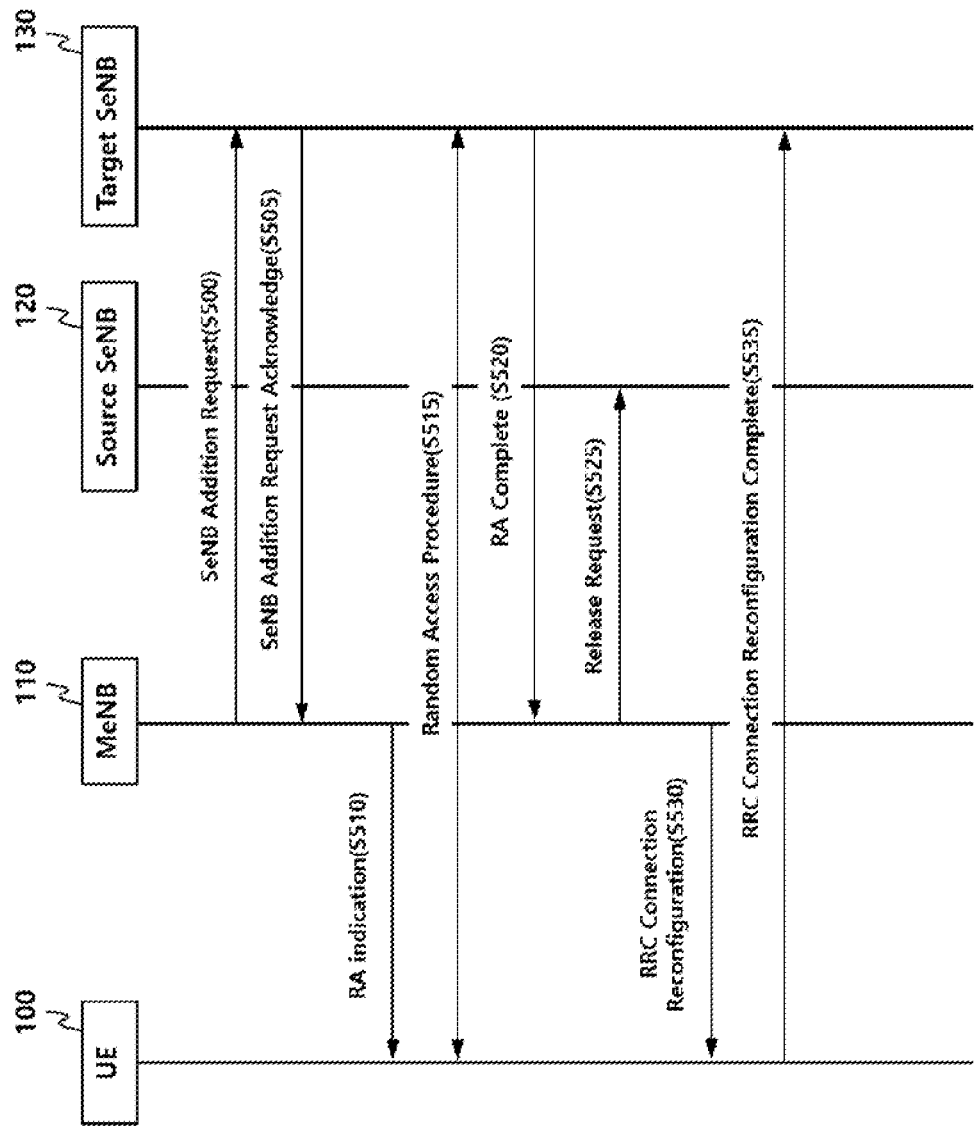
FIG. 5 illustrates another exemplary SeNB change procedure according to the first embodiment.

FIG. 5 illustrates another exemplary SeNB change procedure according to the first embodiment.

Referring to FIG. 5, similarly to the foregoing method of FIG. 4, the target SeNB 130 may notify the MeNB 110 of the completion of the random access procedure, and when the configuration of radio resources for data transmission and/or reception to and/or from the target SeNB 130 is completed, the UE 100 may directly notify the target SeNB 130 of the completion of the configuration of radio resources, instead of via the MeNB 110.

Referring to FIG. 5, steps S500 to S530 may be performed in the same manner as foregoing steps S400 to S430. After step S530, in S535, the UE 100 transmits an RRC connection reconfiguration complete message to the SeNB 130. Through the RRC connection reconfiguration complete message from the UE 100, the target SeNB 130 may be directly notified by the UE 100 whether or not the RRC connection reconfiguration procedure has been successfully performed without the message transmitted from the MeNB 110.

Second Embodiment: Use of Indication Information

Figure 6:
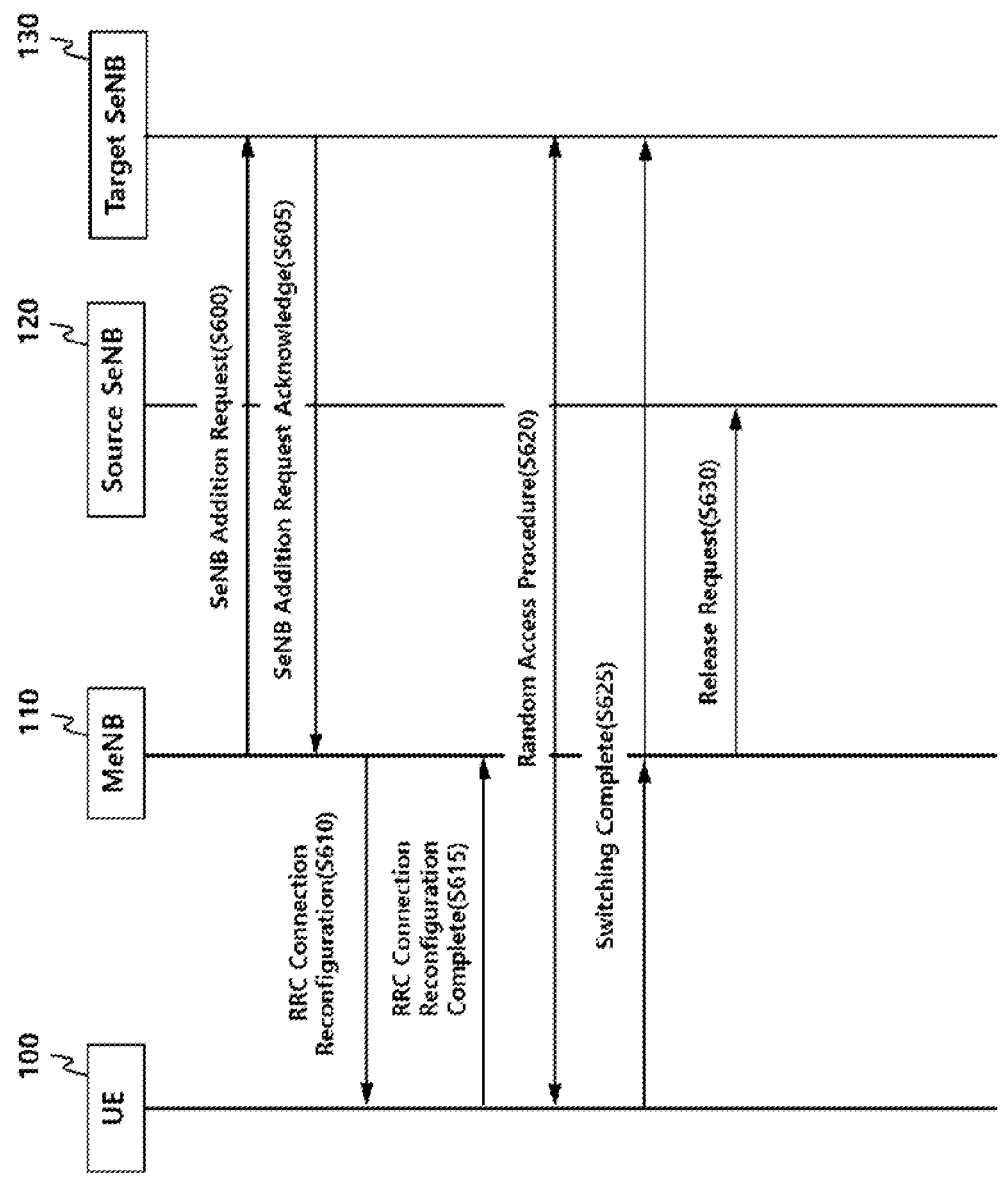
FIG. 6 illustrates an exemplary SeNB change procedure according to a second embodiment.

FIG. 6 illustrates an exemplary SeNB change procedure according to a second embodiment.

Referring to FIG. 6, in S600, the MeNB 110 sends a request message to the target SeNB 130 in an SeNB addition preparation procedure, requesting that the target SeNB 130 allocate resources to the UE 100. When forwarding is necessary, the target SeNB 130 provides a forwarding address to the MeNB 110. In S605, the target SeNB 130 allocates resource to the UE 100 in the addition preparation procedure.

The MeNB 110 triggers the UE 100 to apply the new configuration. In S610, the MeNB 110 indicates an RRC connection reconfiguration message to the UE 100.

For example, the RRC connection reconfiguration message may include SCG mobility control information (mobilityControlInfoSCG) to indicate SeNB change. When the RRC connection reconfiguration message including the SCG mobility control information is received, the UE 100 may synchronize with the target SeNB 130 and access a target cell via an RACH. That is, when the RRC connection reconfiguration message including the SCG mobility control information is received, the UE may directly disconnect the connection to the source SeNB 120 to be connected to the target SeNB 130. The UE starts synchronization with the DL of the target PCell of the target SeNB 130. The UE performs a random access to the target cell by transmitting the RACH to the target cell for UL synchronization.

For another example, the RRC connection reconfiguration message may include information indicating that the UE 100 should release a radio resource configuration provided by the source SeNB 120 after having successfully synchronized with the target SeNB 130. That is, the RRC connection reconfiguration message may include information indicating that the UE 100 should transmit and receive data via the source SeNB 120 and disconnect the connection to the source SeNB 120 when transmitting an RACH preamble to the target SeNB 130, until the UE 100 performs synchronization with the target SeNB 130.

In other words, the MeNB 110 may transmit the RRC connection reconfiguration message for the SeNB change to the UE 100, and the RRC connection reconfiguration message may include information indicating that the UE 100 should remain connected to the source SeNB 120 for communications to a specific point in time, with regard to the target SeNB 130. For example, the specific point in time may be established as at least one point in time among a point in time of DL synchronization of the UE 100, a point in time of RACH transmission, a point in time at which a random access preamble is transmitted, a point in time at which a random access procedure on the target SeNB is terminated, a point in time at which a UL signal is transmitted to the target SeNB, a point in time at which synchronization with the target SeNB is established, and a point in time at which radio resources of the target SeNB are configured.

Hereinafter, for convenience of description and ease of understanding, the information indicating that the UE 100 should release the source SeNB radio resource configuration after having successfully synchronized with the target SeNB 130 will be referred to as information indicating that the UE 100 should maintain an operation of transmitting and/or receiving data to and/or from the source SeNB 120 to a specific point in time with regard to the target SeNB 130. This term is given for convenience of description and may be referred to using other terms for the same or similar concept. For example, this indication information is not limited to the above term and may be referred to using a variety of other terms, such as indication information indicating that data transmission and/or reception to and/or from a source eNB (or a source cell or a source SeNB) should be continued until synchronization with a target eNB (or a target cell or a target SeNB) is performed during an eNB (or cell group or cell) change, indication information indicating that data transmission and/or reception to and/or from the source SeNB 120 should be continued until an RACH is transmitted to the target SeNB 130, indication information indicating that data transmission and/or reception to and/or from the source SeNB 120 should be continued before an RACH is transmitted to the target SeNB 130, indication information indicating that data transmission and/or reception to and/or from the source SeNB 120 should be continued until an RACH preamble transmission to the target SeNB 130 is performed, indication information indicating that data transmission and/or reception to and/or from the source SeNB 120 should be continued until a physical random access channel (PRACH) transmission to the target SeNB 130 is performed, indication information indicating that data transmission and/or reception to and/or from the source SeNB 120 should be continued until a first RACH transmission to the target SeNB 130 is performed, indication information indicating that a connection to the source SeNB 120 should be maintained until a first RACH transmission to the target SeNB 130 is performed, mobility improvement indication information indicating that a connection to the source SeNB 120 should be maintained until synchronization with the target SeNB 130 is performed, indication information indicating that a connection to the source SeNB 120 should be maintained until a random access to the target SeNB 130 is successfully performed, and indication information indicating that a connection to the source SeNB 120 should be maintained until data transmission to the target SeNB 130 is enabled. In the case of handover, the term "source SeNB" may be substituted with "source eNB," and the term "target SeNB" may be substituted with "target eNB."

The information (e.g. indication information) for indicating that the UE 100 should maintain the operation of transmitting and/or receiving data to and/or from the source SeNB 120 to a specific point in time may be included in the SCG mobility control information indicating an SeNB change.

When the RRC connection reconfiguration message including the indication information is received, the UE 100 does not directly disconnect the connection to the source SeNB 120. In the related art, when the RRC connection reconfiguration message including the SCG mobility control information indicating the SeNB change is received, the UE 100 directly disconnects the connection to the source SeNB 120. Thus, the UE 100 prepares for handover by processing the received RRC message, and while the UE 100 is preparing for RF tuning, a data interruption may occur. To solve this problem, when the RRC connection reconfiguration message including the indication information is received, the UE 100 may control the operation of transmitting and/or receiving data to and/or from the source SeNB 120 to be maintained.

For another example, indication information indicating that the UE 100 should maintain the operation of transmitting and/or receiving data to and/or from the source SeNB 120 to a specific point in time with regard to the target eNB or an RRC message including the indication information may include a timer. For example, when the UE 100 has failed to synchronize with the target SeNB 130 before the termination of the corresponding timer, the UE 100 may notify the MeNB 110 of the failure of synchronization. When the UE 100 has succeeded in synchronizing with the target SeNB 130 before the termination of the corresponding timer (RA success), the UE 100 may configure radio resources depending on configuration information included in the RRC connection reconfiguration message. For example, the UE 100 releases the radio resources of the source SeNB. For further another example, the UE 100 adds the radio resources of the source SeNB. For further still another example, the UE 100 resets an SCG MAC, if configured. When data radio bearer (DRB) identification information is SCG DRB, the UE 100 reestablishes a PDCP entity and an SCG RLC entity. When the DRB identification information indicates a split bearer, the UE 100 performs a PDCP data recovery procedure, and then reestablishes the SCG RLC entity. For further yet another example, the UE 100 may break, stop, or disconnect the connection to the source SeNB 120 and may transmit and/or receive data to and/or from the target SeNB 130. The timer may be a T307 timer included in the SCG mobility control information. The timer may be a new timer different from the T307 timer.

In S615, in response to the RRC connection reconfiguration message, the UE 100 sends an RRC connection reconfiguration complete message to the MeNB 110. For example, the UE 100 applies the radio resource configuration and sends the RRC connection reconfiguration complete message to the MeNB 110 before synchronizing with the target SeNB 130, when synchronizing with the target SeNB 130, when disconnecting the connection to the source SeNB 120, or when terminating data transmission and/or reception to and/or from the source SeNB 120.

For example, when synchronization with the target SeNB 130 is successfully performed, DL synchronization is successfully performed, an RACH is transmitted to the target SeNB 130, or a random access to the target SeNB 130 is successfully performed before the timer is terminated, the UE 100 configures radio resources depending on configuration information included in the RRC connection reconfiguration. For example, radio resources of the source SeNB 120 are released. For another example, radio resources of the target SeNB 130 are added. For further another example, an SCG MAC is reset, if configured. When DRB identification information is SCG DRB, the UE 100 reestablishes a PDCP entity and an SCG RLC entity. When the DRB identification information indicates a split bearer, the UE 100 performs a PDCP data recovery procedure, and then reestablishes the SCG RLC entity.

In S620, the UE 100 synchronizes with the target SeNB 130. In this regard, the UE 100 performs a random access procedure on the target SeNB 130.

When radio resources are successfully configured depending on the configuration information included in the RRC connection reconfiguration message (e.g. release of source SeNB radio resources or addition of target SeNB radio resources), the UE 100 notifies the MeNB 110 of the completion of the corresponding operation in S625. The MeNB 110 notifies the target SeNB 130 of the completion. In S630, the MeNB 110 initiates releasing source SeNB resources. When data forwarding is necessary, the MeNB 110 transfers a data forwarding address to the source SeNB 120. Due to the reception of the SeNB release request message, the source SeNB 120 may trigger interruption in providing user data to the UE 100. In addition, if applicable, the SeNB 120 may trigger initiating data forwarding.

Alternatively, when radio resources are successfully configured depending on the configuration information included in the RRC connection reconfiguration message (e.g. release of source SeNB radio resources, addition of target SeNB radio resources, or transmission of an RACH preamble), the UE 100 notifies the target SeNB of the completion of the corresponding operation. For example, the UE 100 may notify the target SeNB 130 of an access by transmitting an RACH preamble or transmitting subsequent data. The target SeNB 130 may indicate that the source SeNB resources should be released. Alternatively, the target SeNB 130 may transmit indication information to the source SeNB 120, indicating that data transmission and/or reception to and/or from the UE 100 should be terminated. When the information indicating that data transmission to and/or data reception from the UE 100 should be terminated is received, the source SeNB 120 may terminate the data transmission to and/or data reception from the UE 100. The target SeNB 130 transfers the data forwarding address to the source SeNB 120.

In S630, the MeNB 110 transmits a release request to the source SeNB 120. Consequently, the source SeNB 120 may disconnect the connection to the UE 100 and release UE contexts.

The UE 100 may transmit UE capability information to the MeNB 110, indicating that the operation of transmitting data to and/or receiving data from the source SeNB 120 can be performed to a specific point in time, before the foregoing step S600. Herein, for convenience of description, information indicating that the operation of transmitting data to and/or receiving data from the source SeNB 120 can be performed to a specific point in time in the SeNB change procedure (or the handover procedure) will be referred to as UE capability information. This term is given merely for convenience of description and may be referred to using other words indicating that the same operation can be performed. For example, the UE capability information may be substituted with UE capability information indicating that a primary synchronization signal (PSS), a secondary synchronization signal (SSS), and/or a cell-specific reference signal (CRS) can be received from other intra-frequency cells, UE capability information indicating that DL synchronization of the target SeNB 130 can be performed, or the like. Regarding the RRC-connected UE 100, the eNB must accurately recognize the UE capability to provide a suitable configuration to the UE 100. For example, the UE capability information indicating that the operation of transmitting and/or receiving data to and/or from the source SeNB can be performed to a specific point in time may be transferred from the UE 100 to the MeNB 110, included in UE radio access capability information, in the UE capability transfer procedure. For another example, the UE capability information may be included in the UE radio access capability information, be indicated as a mobility management entity (MME) via non-access stratum (NAS) signaling (e.g. an attachment procedure) by the UE 100, and be transferred to the MeNB 110 via an S1 interface.

The SeNB addition request message, transmitted to the target SeNB 130 by the MeNB 110 in the foregoing step S600, may include UE capability information indicating that an operation of transmitting data to and/or receiving data from the source eNB can be performed to a specific point in time. The handover request acknowledgement message, received by the MeNB 110 in the step S605, may include information indicating that the UE 100 maintains the operation of transmitting data to and/or receiving data from the source SeNB 120 to a specific point in time. For example, the information indicating that the UE 100 maintains the operation of transmitting data to and/or receiving data from the source SeNB 120 to a specific point in time may be included in the SCG mobility control information. The MeNB 110 transmits an RRC connection reconfiguration message including this indication information to the UE 100. For another example, the information indicating that the operation of transmitting and/or receiving data to and/or from the source eNB should be maintained may be indicated by the MeNB 110.

Alternatively, between S605 and S610, the MeNB 110 may initiate releasing source SeNB resources. When an SeNB release request message is transmitted from the MeNB 110 to the source SeNB 120, the message may include information indicating that the source SeNB 120 should continue transmitting data to and/or receiving data from the UE. When the SeNB release request message including this indication information is received, the source SeNB 120 may continue transmitting data to and/or receiving data from the UE. When information indicating that the operation of transmitting data to and/or receiving data from the UE 100 should be terminated is received from the MeNB 110 or the target SeNB 130, the source SeNB 120 may terminate the operation of transmitting data to and/or receiving data from the UE. When the information indicating that the operation of transmitting data to and/or receiving data from the UE 100 should be terminated is received from the MeNB 110 or the target SeNB 130, the source SeNB 120 transmits an SN status message to the MeNB 110 or the target SeNB 130. When the information indicating the operation of transmitting data to and/or receiving data from the UE 100 should be terminated is received from the MeNB 110 or the target SeNB 130, the source SeNB 120 performs or starts data forwarding to the MeNB 110 or the target SeNB 130.

Alternatively, to prevent a redundant transmission via two eNBs during the eNB change, the UE 100 may include SN status information or a PDCP Status report in Msg 3 when attempting a random access to the target SeNB 130. This information represents a UL/DL PDCP SN status regarding an RLC AM bearer subjected to PDCP status maintenance, and may include at least one of first missing UL SDU(s) reception status bitmap information and first missing DL SDU(s) reception status bitmap information.

Third Embodiment: Use of Two MAC Entities

In accordance with another embodiment, a method may be provided for configuring a bearer entity in a source SeNB MAC entity and a target MAC entity by generating an additional MAC entity for a target SeNB. Such a third embodiment may also be described with reference to FIG. 6. The third embodiment may be implemented using an entirety or a portion of the foregoing embodiments combined therein.

Returning to FIG. 6, in S600, the MeNB 110 requests that the target SeNB 130 allocate resources to UE 100 in an SeNB addition preparation procedure. When data forwarding is necessary, the target SeNB 130 provides a forwarding address to the MeNB 110. In S605, the target SeNB 130 allocates resources the UE 100 in the addition preparation procedure.

The MeNB 110 triggers the UE 100 to apply the new configuration. In S610, the MeNB 110 indicates an RRC connection reconfiguration message to the UE 100. The RRC connection reconfiguration message may include SCG mobility control information (mobilityControlInfoSCG) to indicate SeNB change. When the RRC connection reconfiguration message including the SCG mobility control information is received, the UE 100 may perform an operation of synchronizing with the target SeNB 130 and accessing a target cell via an RACH.

The RRC connection reconfiguration message may include information indicating that the UE 100 should add radio resource information based on which data can be transmitted and/or received via the target SeNB 130, successfully synchronize with the target SeNB 130, and then release a source SeNB radio resource configuration. That is, the RRC connection reconfiguration message may include information indicating that the UE 100 should transmit and receive data via the source SeNB 120 to a specific point in time and disconnect the connection to the source SeNB 120 when transmitting an RACH preamble to the target SeNB 130.

The information indicating that the UE 100 should transmit and/or receive data to and/or from the source SeNB 120 to a specific point in time (e.g. indication information) may be included in SCG mobility control information regarding the SeNB change.

When the RRC connection reconfiguration message including the indication information is received, the UE 100 does not directly disconnect the connection to the source SeNB 120. In the related art, when the RRC connection reconfiguration message including the SCG mobility control information indicating the SeNB change is received, the UE 100 directly disconnects the connection to the source SeNB 120. Thus, the UE 100 prepares for handover by processing the received RRC message, and while the UE 100 is preparing for RF tuning, a data interruption may occur. To solve this problem, when the RRC connection reconfiguration message including the indication information is received, the UE 100 may be controlled to maintain the operation of transmitting data to and/or receiving data from the source SeNB 120.

The UE 100 adds a radio resource configuration for transmitting and/or receiving data via the target SeNB 130. For example, the UE 100 performs at least one operation among addition of a target SCG, generation and/or addition of a target S-MAC, addition of a radio bearer PDCP/RLC entity associated with the corresponding cell group, and reconfiguration of a radio bearer entity associated with the SCG.

For another example, the information indicating that the UE 100 should transmit data to and/or receive data from the source SeNB to a specific point in time before accessing the target eNB or the RRC message including this indication information may include a timer.

For example, when the UE 100 has failed to synchronize with the target SeNB 130 before the termination of the corresponding timer, the UE 100 may notify the MeNB 110 of the failure of synchronization. When the UE 100 has succeeded in synchronizing with the target SeNB 130 before the termination of the corresponding timer (RA success), the UE 100 releases radio resources of the source SeNB 120.

For example, the UE 100 performs at least one operation among release of a source SCG cell, release of a source S-MAC, reestablishment of an RLC entity associated with a source SCG and/or a source S-MAC, release of an RLC entity associated with a source SCG and/or a source S-MAC, reestablishment of a PDCP entity and an SCG RLC entity if DRB identification information is SCG DRB, and implementation of a PDCP data recovery procedure and reestablishment of an SCG RLC entity in case of a split bearer. For another example, the UE 100 may break, stop, or disconnect the connection to the source SeNB 120 and may transmit and/or receive data to and/or from the target SeNB 130. The timer may be a T307 timer included in the SCG mobility control information. The timer may be a new timer different from the T307 timer.

In S615, the UE 100 sends an RRC connection reconfiguration complete message to the MeNB 110. For example, the UE 100 applies the radio resource configuration and sends the RRC connection reconfiguration complete message to the MeNB 110 when synchronizing with the target SeNB 130, when disconnecting the connection to the source SeNB 120, or when terminating data transmission and/or reception to and/or from the source SeNB 120.

For example, when synchronization with the target SeNB 130 is successfully performed, DL synchronization is successfully performed, an RACH is transmitted to the target SeNB 130, or a random access to the target SeNB 130 is successfully performed before the timer is terminated, the UE 100 configures radio resources depending on configuration information included in the RRC connection reconfiguration. For example, the UE 100 performs at least one operation among release of a source SCG cell, release of a source S-MAC, reconfiguration of an RLC entity associated with a source SCG and/or a source S-MAC, release of an RLC entity associated with a source SCG and/or a source S-MAC, reconfiguration of a PDCP entity and an SCG RLC entity if DRB identification information is SCG DRB, and implementation of a PDCP data recovery procedure and reestablishment of an SCG RLC entity in case of a split bearer.

In S620, the UE 100 synchronizes with the target SeNB 130. In this regard, the UE 100 performs a random access procedure on the target SeNB 130.

When radio resources are successfully configured depending on the configuration information included in the RRC connection reconfiguration message (e.g. release of source SeNB radio resources or addition of target SeNB radio resources), the UE 100 notifies the MeNB 110 of the completion of the corresponding operation in S625. The MeNB 110 notifies the target SeNB 130 of the completion. In S630, the MeNB 110 initiates releasing source SeNB resources. When data forwarding is necessary, the MeNB 110 transfers a data forwarding address to the source SeNB 120. Due to the reception of the SeNB release request message, the source SeNB 120 may trigger interruption in providing user data to the UE 100. In addition, if applicable, the SeNB 120 may trigger initiating data forwarding.

Alternatively, when radio resources are successfully configured depending on the configuration information included in the RRC connection reconfiguration message (e.g. release of source SeNB radio resources, addition of target SeNB radio resources, or transmission of an RACH preamble), the UE 100 notifies the target SeNB of the completion of the corresponding operation. For example, the UE 100 may notify the target SeNB 130 of an access by transmitting an RACH preamble. The target SeNB 130 may indicate that the source SeNB resources should be released. Alternatively, the target SeNB 130 may transmit indication information to the source SeNB 120, indicating that data transmission to and/or data reception from the UE 100 should be terminated. When the information indicating that data transmission to and/or data reception from the UE 100 should be terminated is received, the source SeNB 120 may terminate the data transmission to and/or data reception from the UE 100. The target SeNB 130 transfers the data forwarding address to the source SeNB 120.

In S630, the MeNB 110 transmits a release request to the source SeNB 120. Consequently, the source SeNB 120 may disconnect the connection to the UE 100 and release UE contexts.

The UE 100 may transmit UE capability information to the MeNB 110, indicating that the operation of transmitting data to and/or receiving data from the source SeNB 120 can be performed to a specific point in time, before the foregoing step S600. Herein, for convenience of description, information indicating that the operation of transmitting and/or receiving data to and/or from the source SeNB 120 can be performed to a specific point in time in the SeNB change procedure (or the handover procedure) will be referred to as UE capability information. This term is given merely for convenience of description and may be referred to using other words indicating that the same operation can be performed. For example, this term may be substituted with UE capability information indicating that a PSS, an SSS, and/or a CRS can be received from other intra-frequency cells, UE capability information indicating that DL synchronization of the target SeNB 130 can be performed, or the like. Regarding the RRC-connected UE 100, the eNB must accurately recognize the UE capability to provide a suitable configuration to the UE 100. For example, the UE capability information indicating that the operation of transmitting data to and/or receiving data from the source SeNB can be performed to a specific point in time may be transferred from the UE 100 to the MeNB 110, included in UE radio access capability information, in the UE capability transfer procedure. For another example, the UE capability information may be included in the UE radio access capability information, be indicated as an MME via NAS signaling (e.g. an attachment procedure) by the UE 100, and be transferred to the MeNB 110 via an S1 interface.

The SeNB addition request message, transmitted to the target SeNB 130 by the MeNB 110 in the foregoing step S600, may include UE capability information indicating that an operation of transmitting data to and/or receiving data from the source eNB can be performed to a specific point in time. The handover request acknowledgement message, received by the MeNB 110 in the step S605, may include information indicating that the UE 100 maintains the operation of transmitting data to and/or receiving data from the source SeNB 120 to a specific point in time. For example, the information indicating that the UE 100 maintains the operation of transmitting data to and/or receiving data from the source SeNB 120 to a specific point in time may be included in the SCG mobility control information. The MeNB 110 transmits an RRC connection reconfiguration message including this indication information to the UE 100. For another example, the information indicating that the operation of transmitting data to and/or receiving data from the source eNB should be maintained may be indicated by the MeNB 110.

Alternatively, between S605 and S610, the MeNB 110 may initiate the release of source SeNB resources. When an SeNB release request message is transmitted from the MeNB 110 to the source SeNB 120, the message may include information indicating that the source SeNB 120 should continue transmitting data to and/or receiving data from the UE. When the SeNB release request message including this indication information is received, the source SeNB 120 may continue transmitting data to and/or receiving data from the UE. When information indicating that the operation of transmitting data to and/or receiving data from the UE 100 should be terminated is received from the MeNB 110 or the target SeNB 130, the source SeNB 120 may terminate the operation of transmitting data to and/or receiving data from the UE. When the information indicating that the operation of transmitting data to and/or receiving data from the UE 100 should be terminated is received from the MeNB 110 or the target SeNB 130, the source SeNB 120 transmits an SN status message to the MeNB 110 or the target SeNB 130. When the information indicating the operation of transmitting data to and/or receiving data from the UE 100 should be terminated is received from the MeNB 110 or the target SeNB 130, the source SeNB 120 performs or starts data forwarding to the MeNB 110 or the target SeNB 130.

Alternatively, to prevent a redundant transmission via two eNBs during the eNB change, the UE 100 may include SN status information or a PDCP Status report in Msg 3 when attempting a random access to the target SeNB 130. This information represents a UL/DL PDCP SN status regarding an RLC AM bearer subjected to PDCP status maintenance, and may include at least one of first missing UL SDU(s) reception status bitmap information and first missing DL SDU(s) reception status bitmap information.

The first to third embodiments as set forth above may be used individually or by combining some steps thereof. In the respective embodiments, the sequences of some steps may be modified or some steps may be omitted.

Although it has been described herein with regard to the method of changing an SeNB when the UE configures dual connectivity, the same technical concept is applicable to a handover process of the UE, as described above. When applied to the handover process, the MeNB and the source SeNB may be substituted with a source eNB, and the target SeNB may be substituted with a target eNB.

Hereinafter, operations of the UE and the eNBs (the source SeNB and the target SeNB) will be briefly described again with reference to the drawings.

Figure 7:
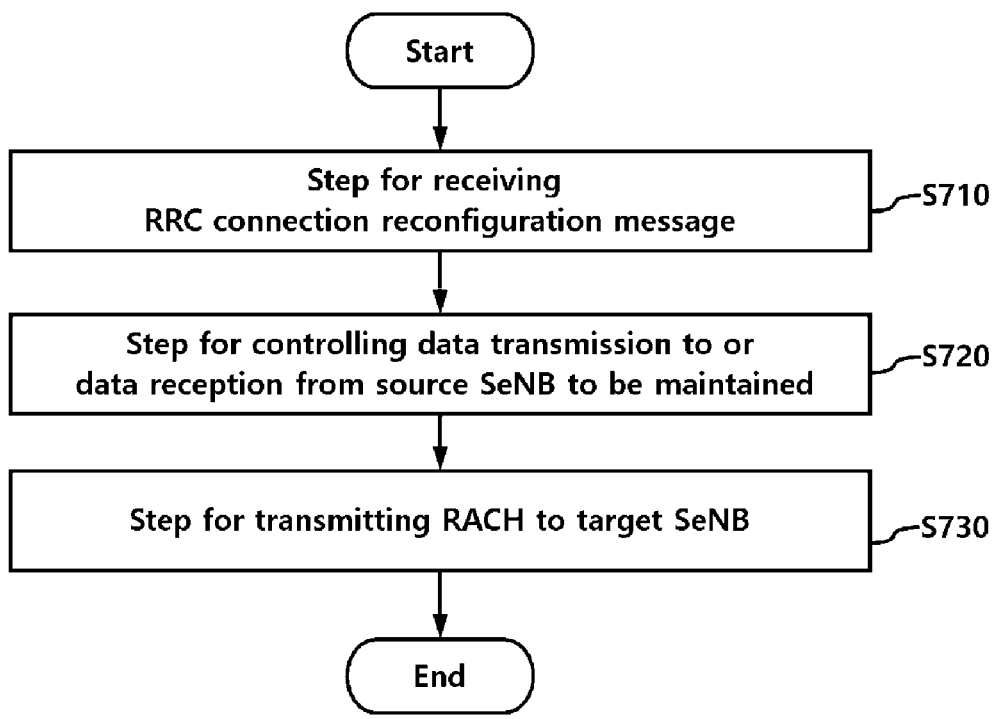
FIG. 7 illustrates a User equipment (UE) operation according to an embodiment.

FIG. 7 illustrates operations of a user equipment (UE) according to an embodiment.

Referring to FIG. 7, in a method of performing a mobility control operation, in S710, the UE receives an RRC connection reconfiguration message including mobility control information from the MeNB. The MeNB determines SeNB change of the UE, and transmits a higher layer signaling message including mobility control information to the UE. The UE performs an SeNB change procedure by receiving the higher layer signaling message (e.g. an RRC connection reconfiguration message). A case of the SeNB change procedure of the dual connectivity terminal will be mainly discussed, as described above, and the UE may perform a handover procedure by receiving the higher layer signaling message from the source eNB.

For example, the mobility control information includes SCG mobility control information regarding the SeNB change. In addition, the RRC connection reconfiguration message may include information indicating that the UE should maintain an operation of transmitting and/or receiving data to and/or from a source SeNB to a specific point in time with respect to a target SeNB. As described above in the foregoing embodiments, the term "information indicating that the operation of transmitting and/or receiving data to and/or from the source SeNB should be maintained" is illustrative only, and may be referred to using a variety of other words. That is, this information is intended to indicate that the data transmission and/or reception operation should be maintained via the source SeNB to a specific point in time when the UE performs the SeNB change procedure, and the term of the information is not limited.

The RRC connection reconfiguration message may further include information regarding the configuration of radio resources of the target SeNB, information regarding the release of radio resources of the source SeNB, and the like, which are necessary for the UE to change the SeNB.

In S270, the UE controls the operation of transmitting and/or receiving data to and/or from the source SeNB 120 to be maintained to a specific point in time, based on the mobility control information. When the UE performs the SeNB change procedure by receiving the RRC connection reconfiguration message, the UE maintains the data transmission and/or reception operation to a specific point in time without directly disconnecting the connection to the source SeNB in order to reduce a length of data interruption time.

For example, the specific point in time may be established as at least one point in time among a point in time at which an RACH is transmitted, a point in time at which a random access preamble is transmitted, a point in time at which a random access procedure on the target SeNB is terminated, a point in time at which a UL signal is transmitted to the target SeNB, a point in time at which synchronization with the target SeNB is established, and a point in time at which radio resources of the target SeNB are configured. Alternatively, the specific point in time may be a point in time at which the UE starts a synchronization procedure on the target SeNB or the synchronization procedure is completed.

The specific point in time may be specified by the RRC connection reconfiguration message or pre-established. The specific point in time may also be established in the UE using a separate signal by the MeNB.

In S730, the UE transmits an RACH regarding the implementation of a random access procedure to the target SeNB. When performing the SeNB change procedure, the UE transmits the RACH regarding the implementation of a random access procedure to the target SeNB while maintaining a connection to the source SeNB. For example, the UE may transmit the random access preamble to the target SeNB via the RACH.

In the related art, when the UE receives an RRC connection reconfiguration message from the MeNB, the UE directly disconnects the connection to the source SeNB and performs a synchronization procedure on the target SeNB using the message. In contrast, the UE can start synchronization with the target SeNB while maintaining the radio resources of the source SeNB. It is therefore possible to reduce a period of interrupting data transmission, between the release of the source SeNB and the addition of the target SeNB.

In addition, the UE may perform all or portions of the foregoing operations of the first to third embodiments, as required.

Figure 8:
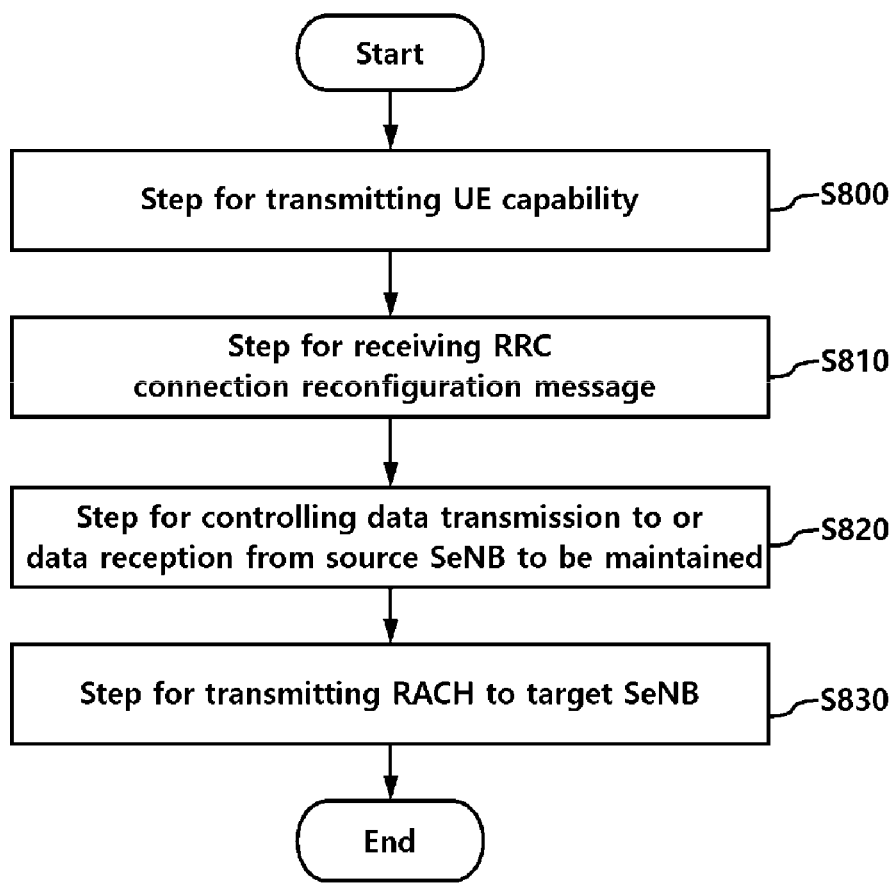
FIG. 8 illustrates a UE operation according to another embodiment.

FIG. 8 illustrates operations of a UE according to another embodiment.

Referring to FIG. 8, in S800, the UE may transmit UE capability information to the MeNB before the above-described step of receiving an RRC connection reconfiguration message including mobility control information from the MeNB.

For example, the UE capability information may include information indicating that the UE can maintain an operation of transmitting data to and/or receiving data from the source SeNB to a specific point in time. For example, the UE capability information may be transferred to the MeNB, included in UE radio access capability information, in a UE capability transfer procedure. For another example, the UE capability information may be included in the UE radio access capability information, be indicated as an MME via NAS signaling (e.g. an attachment procedure) by the UE 100, and be transferred to the MeNB via an S1 interface.

Consequently, the MeNB may previously determine whether or not the UE can perform a synchronization procedure on the target SeNB while maintaining a connection to the source SeNB according to the present embodiments.

In S810, the MeNB may transmit an RRC connection reconfiguration message regarding SeNB change of the UE to the UE, using the received UE capability information, and the UE may receive the RRC connection reconfiguration message.

When the UE performs the SeNB change procedure using the received RRC connection reconfiguration message, the UE may maintain data transmission and/or reception to and/or from the source SeNB in S820, and the UE may transmit an RACH to perform a synchronization procedure on the target SeNB in S830.

Figure 9:
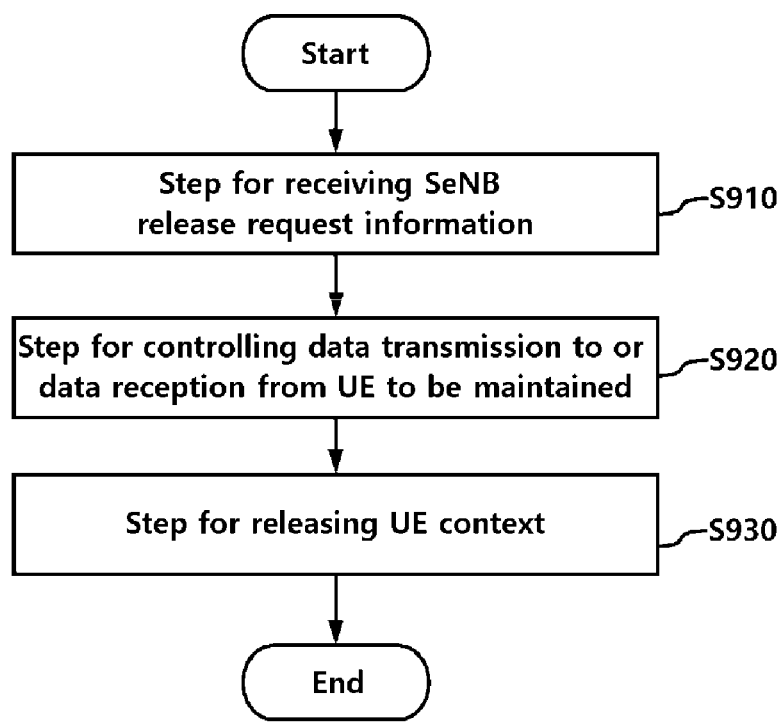
FIG. 9 illustrates a source SeNB operation according to an embodiment.

FIG. 9 illustrates operations of a source SeNB according to an embodiment.

Referring to FIG. 9, in S910, the source SeNB receives SeNB release request information from the MeNB. The SeNB release request information may include information indicating that the source SeNB should maintain an operation of transmitting data to and/or receiving data from the UE until a specific point in time. For example, the source SeNB may receive information indicating that the source SeNB should maintain a communication state with the UE until a specific point in time in the SeNB change procedure.

For example, the specific point in time may be established as at least one point in time among a point in time at which the UE transmits an RACH to the target SeNB, a point in time at which the UE transmits a random access preamble to the target SeNB, a point in time at which a random access procedure of the UE on the target SeNB is terminated, a point in time at which the UE transmits a UL signal to the target SeNB, a point in time at which the UE synchronizes with the target SeNB, and a point in time at which the UE configures target SeNB radio resources.

In S920, the source SeNB maintains the operation of transmitting data to and/or receiving data from the UE until a specific point in time. The source SeNB maintains the operation of transmitting and/or receiving data to and/or from the UE, in response to an indication from the MeNB. For example, the source SeNB may be notified by the UE or the MeNB, as to whether the specific point in time has arrived. The source SeNB may also be notified as to whether or not the specific point in time has arrived, by directly receiving information from the target SeNB. Before it is notified that the specific point in time has passed, the source SeNB may ordinarily perform the data transmission operation and/or the data reception operation by maintaining a connection to the UE. When data forwarding is requested or necessary, corresponding data may be forwarded to the MeNB or the target SeNB.

When the specific point in time has passed, in S930, the source SeNB releases UE context. When the source SeNB is notified that the specific point in time has arrived due to the operation of the UE or the operation of the MeNB or the target SeNB, the source SeNB disconnects the connection to the UE. Alternatively, when an explicit release request is received from the UE, the MeNB, or the target SeNB, the source SeNB may disconnect the connection to the UE.

Specifically, when the specific point in time has passed, the source SeNB may release the UE context.

Figure 10:
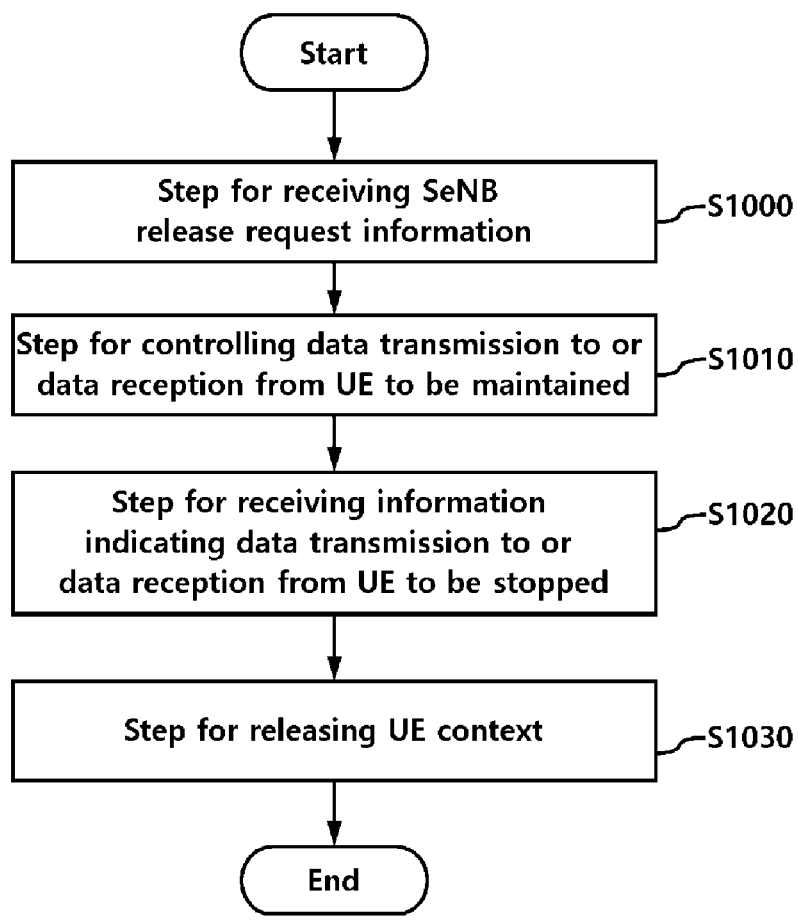
FIG. 10 illustrates a source SeNB operation according to another embodiment.

FIG. 10 illustrates operations of a source SeNB according to another embodiment.

Before the step of releasing UE context, the source SeNB may receive information indicating that the operation of transmitting data to and/or receiving data from the UE should be stopped from the target SeNB.

Referring to FIG. 10, in S1000, the source SeNB receives SeNB release request information from the MeNB. In response to the MeNB determining to initialize an SeNB change procedure, the source SeNB receives the SeNB release request information. The SeNB release request information may include information indicating that the source SeNB should maintain the operation of transmitting and/or receiving data to and/or from the UE until a specific point in time. For example, the source SeNB may receive information indicating that the source SeNB should maintain a communication state with the UE until a specific point in time in the SeNB change procedure.

In S1010, the source SeNB maintains the operation of transmitting data to and/or receiving data from the UE until a specific point in time. The source SeNB maintains the operation of transmitting data to and/or receiving data from the UE in response to an indication from the MeNB.

Afterwards, in S1020, the source SeNB may receive information indicating that the source SeNB should terminate the connection to the UE from the SeNB. For example, the source SeNB may receive information indicating that the target SeNB has completed synchronization with the UE. In addition, the source SeNB may receive information that the specific point in time has arrived (e.g. the target SeNB has received an RACH from the UE or the random access procedure between the target SeNB and the UE is terminated). As described above, the information received by the source SeNB may be configured variously depending on the establishment of the specific point in time. The information received by the source SeNB may be information explicitly indicating that the connection to the UE should be disconnected (e.g. the UE context should be released).

In S1030, the source SeNB releases the UE context by receiving information indicating that the connection to the UE should be disconnected from the target SeNB.

Figure 11:
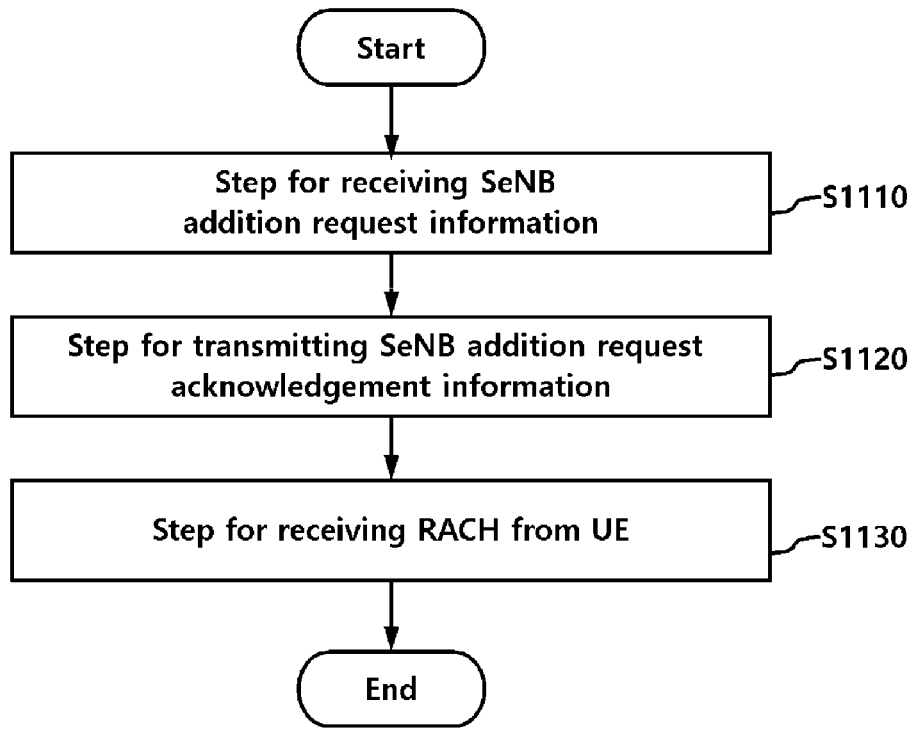
FIG. 11 illustrates a target SeNB operation according to an embodiment.

FIG. 11 illustrates operations of a target SeNB according to an embodiment.

Referring to FIG. 11, in S1110, the target SeNB receives SeNB addition request information from the MeNB. When the MeNB determines to change the SeNB of the UE, the target SeNB may receive the SeNB addition request information from the MeNB. For example, the SeNB addition request information may include UE capability information. As described above, the UE capability information may include information indicating that the UE can maintain an operation of transmitting data to and/or receiving data from the source SeNB until a specific point in time. For another example, the SeNB addition request information may include information requesting radio resources of the target SeNB. The radio resources of the target SeNB mean information based on which the UE configures dual connectivity with the target SeNB.

In S1120, the target SeNB transmits SeNB addition request acknowledgement information to the MeNB. In response to the request from the MeNB, the target SeNB generates and transmits SeNB addition request acknowledgement information. For example, the SeNB addition request acknowledgement information may include information indicating that the UE 100 should maintain the operation of transmitting data to and/or receiving data from the source SeNB until a specific point in time. For another example, the SeNB addition request acknowledgement information may include information regarding the radio resources of the target SeNB. The radio resources of the target SeNB are used as information based on which the UE configures dual connectivity with the target SeNB. The SeNB addition request acknowledgement information may be transferred to the UE via the MeNB, which may transmit the SeNB addition request acknowledgement information to the UE by including the SeNB addition request acknowledgement information in the above-described RRC connection reconfiguration message.

In S1130, the target SeNB receives an RACH for the implementation of a random access procedure from the UE. The target SeNB may receive the RACH that the UE transmits while maintaining a connection to the source SeNB. For example, the RACH may include a random access preamble, and the target SeNB may perform a synchronization procedure on the UE using the received RACH. For example, the target SeNB may acknowledge the received random access preamble and transmit a random access response to the UE.

Figure 12:
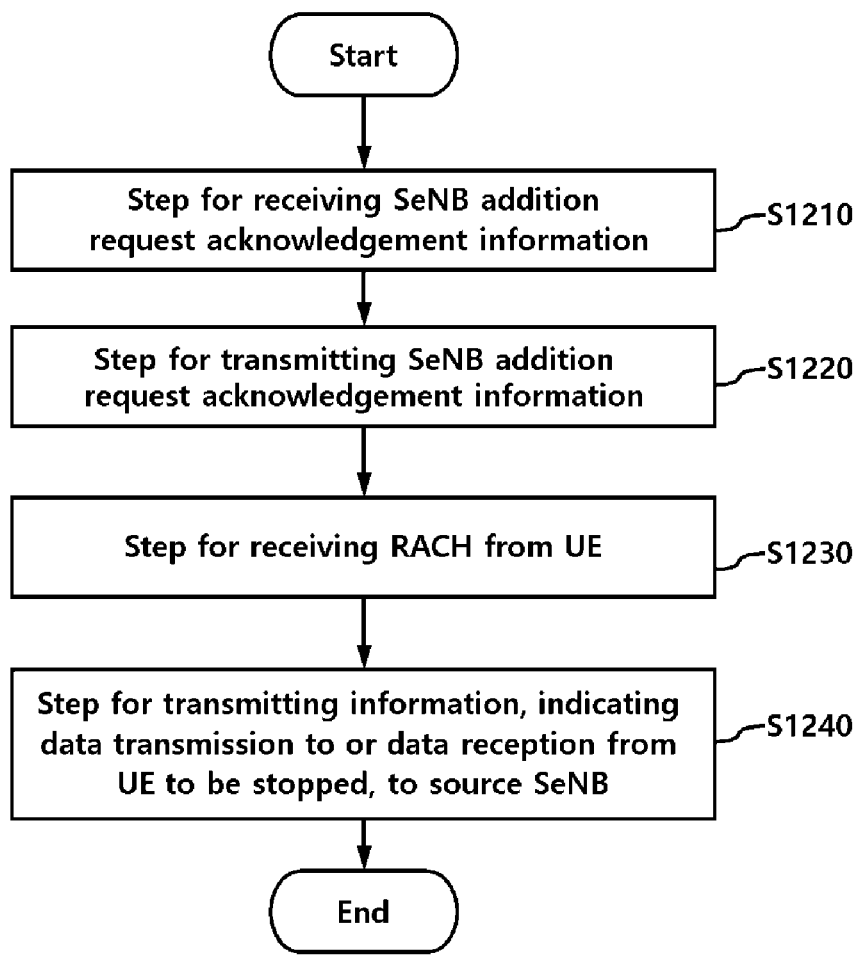
FIG. 12 illustrates a target SeNB operation according to another embodiment.

FIG. 12 illustrates operations of a target SeNB according to another embodiment.

When an RACH is received, the target SeNB may transmit indication information to the source SeNB, indicating that the source SeNB should terminate data transmission to the UE and/or data reception from the UE.

Referring to FIG. 12, in S1210, the target SeNB receives SeNB addition request information from the MeNB. In S1220, the target SeNB responsively transmits SeNB addition request acknowledgement information to the MeNB. Afterwards, in S1230, the target SeNB receives an RACH that the UE transmitted while maintaining a connection to the source SeNB. The steps S1210 to S1230 are the same as the above-described steps S1110 to S1130, and detailed descriptions thereof will be omitted.

When the RACH is received, the target SeNB transmits indication information to the source SeNB, indicating that the source SeNB should terminate the operation of transmitting data to and/or receiving data from the UE, in S1240. That is, when the RACH is received, the target SeNB determines that the above-described point in time has arrived and transmits indication information to the source SeNB, indicating that a connection to the UE should be terminated.

As described above, the specific point in time may be variously established, and a point in time at which the target SeNB transmits indication information to the source SeNB, indicating that the connection to the UE should be terminated, may be varied depending on the established specific point in time.

For example, when the specific point in time is established as a point in time at which the random access procedure between the UE and the target SeNB is terminated, the target SeNB may transmit indication information to the source SeNB, indicating that the connection to the UE should be terminated, after the random access procedure is terminated.

In another example, when the specific point in time is established as a point in time at which the UE synchronizes with the target SeNB, the target SeNB may transmit indication information to the source SeNB, indicating that the connection to the UE should be terminated, after having synchronized with the UE.

In addition, the specific point in time may be established various according to the foregoing embodiments, and when the specific point in time arrives, the target SeNB may transmit indication information to the source SeNB, indicating that the operation of transmitting and/or receiving data to and/or from the UE should be terminated.

As set forth above, the present embodiments can reduce a period for which data transmissions may be interrupted due to a cell change or an eNB change, so that the cell or eNB can be reliably changed. In addition, the present embodiments can prevent degradations in service quality that would otherwise occur when the user interrupts the transmission and/or reception of data.

Hereinafter, configurations of the UE, source SeNB, and target SeNB able to implement all of the embodiments described above with reference FIGS. 1 to 12 will be described again with reference to the drawings.

Figure 13:
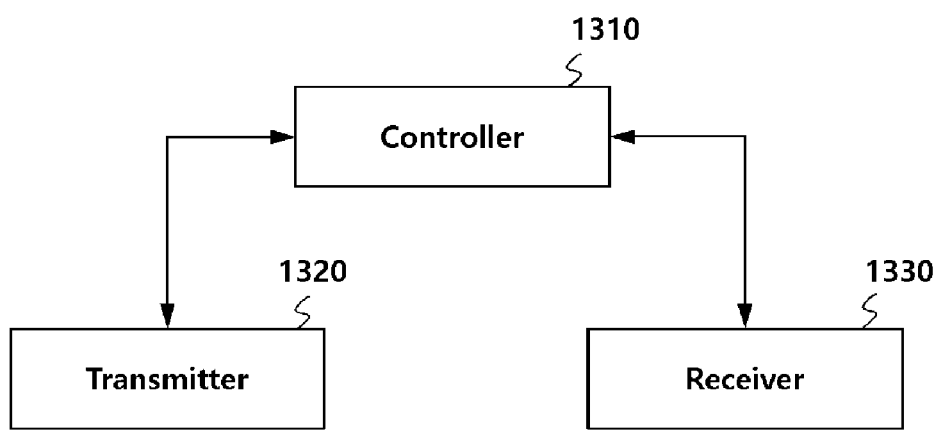
FIG. 13 illustrates a UE configuration according to another embodiment.

FIG. 13 illustrates a UE according to another embodiment.

Referring to FIG. 13, a UE 1300 may include: a receiver 1330 receiving an RRC connection reconfiguration message including mobility control information from an MeNB; a controller 1310 controlling data transmission to and/or data reception from a source SeNB until a specific point in time, based on the mobility control information; and a transmitter 1320 transmitting an RACH, regarding implementation of a random access procedure, to a target SeNB.

The mobility control information includes SCG mobility control information regarding SeNB change. In addition, the RRC connection reconfiguration message may include information indicating that the UE should maintain an operation of transmitting data to and/or receiving data from the source SeNB until a specific point in time with regard to the target SeNB. The RRC connection reconfiguration message may further include information necessary for the UE to perform the SeNB change, such as target SeNB radio resource configuration information or source SeNB radio resource release information.

In the implementation of an SeNB change procedure by receiving the RRC connection reconfiguration message, the controller 1310 maintain the data transmission operation and/or the data reception operation until a specific point in time without directly disconnecting a connection to the source SeNB in order to reduce a period for which data are interrupted. For example, the specific point in time may be established as at least one point in time among a point in time at which an RACH is transmitted, a point in time at which a random access preamble is transmitted, a point in time at which a random access procedure on the target SeNB is terminated, a point in time at which a UL signal is transmitted to the target SeNB, a point in time at which synchronization with the target SeNB is established, and a point in time at which radio resources of the target SeNB are configured. Alternatively, the specific point in time may be a point in time at which the UE starts a synchronization procedure on the target SeNB or the synchronization procedure is completed. The specific point in time may be specified by the RRC connection reconfiguration message or pre-established. The specific point in time may also be established in the UE using a separate signal by the MeNB.

The transmitter 1320 transmits the RACH, for the implementation of the random access procedure, to the target SeNB while maintaining the connection to the source SeNB. For example, the UE may transmit the random access preamble to the target SeNB via the RACH. The transmitter 1320 may transmit UE capability information to the MeNB. For example, the UE capability information may include information indicating that the UE can perform an operation of maintaining data transmission to and/or reception from the source SeNB until a specific point in time. For example, the UE capability information may be transferred to the MeNB, included in UE radio access capability information, in a UE capability transfer procedure. For another example, the UE capability information may be included in the UE radio access capability information, be indicated as an MME via NAS signaling (e.g. an attachment procedure) by the UE, and be transferred to the MeNB via an S1 interface.

In addition, in the SeNB change procedure necessary for the implementation of the foregoing embodiments, the controller 1310 controls the overall operation of the UE 1300, associated with maintaining the connection to the source SeNB until a specific point in time.

In addition, the transmitter 1320 and the receiver 1330 are used to transmit and receive signals, messages, and data, necessary for the implementation of the foregoing embodiments, to and from the MeNB, the source SeNB, and the target SeNB.

Figure 14:
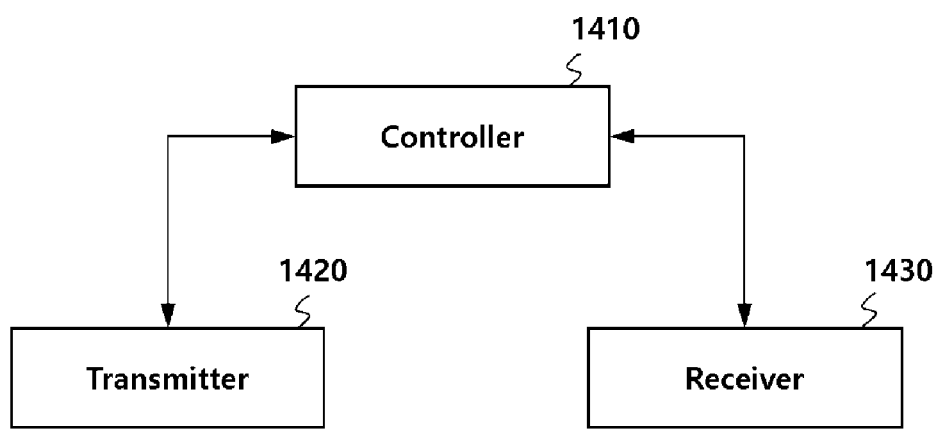
FIG. 14 illustrates a source SeNB configuration according to a further embodiment.

FIG. 14 illustrates a source SeNB according to a further embodiment.

Referring to FIG. 14, a source SeNB 1400 may include a receiver 1430 receiving SeNB release request information from the MeNB and a controller 1410 maintaining an operation of transmitting data to and/or receiving data from the UE until a specific point in time, and when the specific point in time has passed, releasing UE context.

The SeNB release request information may include information indicating that the source SeNB should maintain the operation of transmitting data to and/or receiving data from the UE until a specific point in time. For example, the receiver 1430 may receive information indicating that the source SeNB should maintain a communication state with the UE until a specific point in time in an SeNB change procedure. For example, the specific point in time may be established as at least one point in time among a point in time at which the UE transmits an RACH to the target SeNB, a point in time at which the UE transmits a random access preamble to the target SeNB, a point in time at which a random access procedure of the UE on the target SeNB is terminated, a point in time at which the UE transmits a UL signal to the target SeNB, a point in time at which the UE synchronizes with the target SeNB, and a point in time at which the UE configures target SeNB radio resources.

The controller 1410 maintains the operation of transmitting data to and/or receiving data from the UE in response to an indication from the MeNB. For example, the controller 1410 may be notified by the UE or the MeNB, as to whether the specific point in time has arrived. The controller 1410 may also be notified as to whether or not the specific point in time has arrived, by directly receiving information from the target SeNB. Before it is notified that the specific point in time has passed, the source SeNB may ordinarily perform the data transmission operation and/or the data reception operation by maintaining a connection to the UE. When data forwarding is requested or necessary, the controller 1410 may forward corresponding data to the MeNB or the target SeNB. In addition, when the controller 1410 is notified that the specific point in time has arrived due to the operation of the UE or the operation of the MeNB or the target SeNB, the controller 1410 disconnects the connection to the UE.

In addition, in the SeNB change procedure necessary for the implementation of the foregoing embodiments, the controller 1410 controls the overall operation of the source SeNB 1400, associated with maintaining the connection to the UE until a specific point in time.

The receiver 1430 may receive SeNB release request information from the MeNB. The SeNB release request information may include information indicating that the source SeNB should maintain the operation of transmitting data to and/or receiving data from the UE until a specific point in time. For example, the receiver 1430 may receive information indicating that a communication state between the UE and the source SeNB should be maintained until a specific point in time in the SeNB change procedure.

In addition, the transmitter 1420 and the receiver 1430 transmit and receive signals, messages, and data, necessary for the implementation of the foregoing embodiments, to and from the UE, the MeNB, and the target SeNB.

Figure 15:
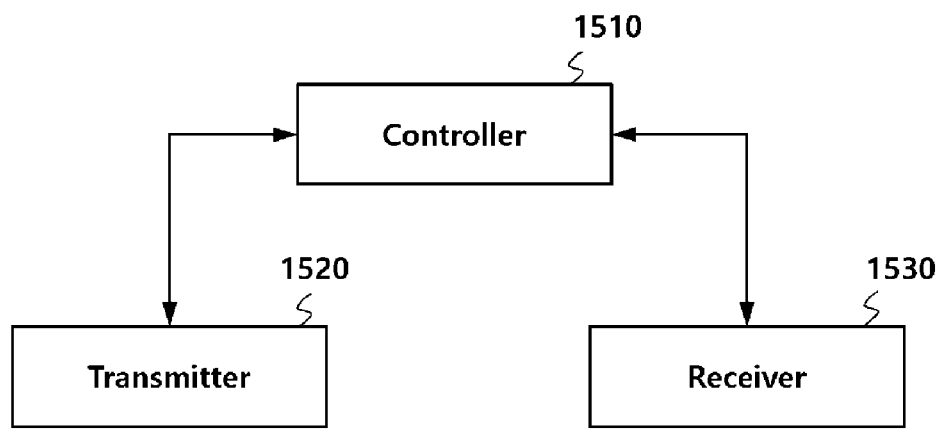
FIG. 15 illustrates a target SeNB configuration according to another embodiment.

FIG. 15 illustrates a target SeNB according to another embodiment.

A target SeNB1500 includes a receiver 1530 receiving SeNB addition request information from the MeNB and a transmitter transmitting SeNB addition request acknowledgement information to the MeNB. The receiver 1530 may also receive an RACH regarding the implementation of a random access procedure from the UE.

The receiver 1530 may receive the SeNB addition request information from the MeNB. For example, the SeNB addition request information may include UE capability information. As described above, the UE capability information may include information indicating that the UE can maintain an operation of transmitting data to and/or receiving data from the source SeNB until a specific point in time. For another example, the SeNB addition request information may include information requesting radio resources of the target SeNB. The radio resources of the target SeNB mean information based on which the UE configures dual connectivity with the target SeNB. The receiver 1530 may receive a random access preamble for the implementation of synchronization from the UE.

In response to a request from the MeNB, the transmitter 1530 generates and transmits SeNB addition request acknowledgement information. For example, the SeNB addition request acknowledgement information may include information indicating that the UE 100 should maintain the operation of transmitting and/or receiving data to and/or from the source SeNB until a specific point in time. For another example, the SeNB addition request acknowledgement information may include information regarding the radio resources of the target SeNB. When the RACH is received, the transmitter 1520 may transmit indication information to the source SeNB, indicating that the operation of transmitting and/or receiving data to and/or from the UE should be terminated. That is, when the RACH is received, the transmitter 1520 determines that the specific point in time has arrived and transmits indication information to the source SeNB, indicating that a connection to the UE should be terminated.

As described above, the specific point in time may be variously established, and a point in time at which the transmitter 1520 transmits indication information to the source SeNB, indicating that the connection to the UE should be terminated, may be varied depending on the established specific point in time.

For example, when the specific point in time is established as a point in time at which the random access procedure between the UE and the target SeNB is terminated, the transmitter 1520 may transmit indication information to the source SeNB, indicating that the connection to the UE should be terminated, after the random access procedure is terminated.

For another example, when the specific point in time is established as a point in time at which the UE synchronizes with the target SeNB, the transmitter 1520 may transmit indication information to the source SeNB, indicating that the connection to the UE should be terminated, after having synchronized with the UE.

In addition, the specific point in time may be established various according to the foregoing embodiments, and when the specific point in time arrives, the transmitter 1520 may transmit indication information to the source SeNB, indicating that the operation of transmitting and/or receiving data to and/or from the UE should be terminated.

In addition, in the SeNB change procedure necessary for the implementation of the foregoing embodiments, the controller 1510 controls the overall operation of the target SeNB 1500, associated with maintaining the connection between the UE and the source SeNB until a specific point in time.

In addition, the transmitter 1520 and the receiver 1530 are used to transmit and receive signals, messages, and data, necessary for the implementation of the foregoing embodiments, to and from the MeNB, the source SeNB, and the UE.

The standard contents or standard documents mentioned in the foregoing embodiments shall be understood to be incorporated herein although they are omitted to simplify the description of the specification. Therefore, portions of the standard contents or the standard documents, added to the specification or described in the appended Claims, should be interpreted as falling within the scope of the present disclosure.

The foregoing descriptions and the accompanying drawings have been presented in order to explain the certain principles of the present invention. A person skilled in the art to which the invention relates can make many modifications and variations by combining, dividing, substituting for, or changing the elements without departing from the principle of the invention. The foregoing embodiments disclosed herein shall be interpreted as illustrative only but not as limitative of the principle and scope of the invention. It should be understood that the scope of the invention shall be defined by the appended Claims and all of their equivalents fall within the scope of the invention.

The invention claimed is:

1. A method of performing a mobility control operation by a terminal, the method comprising:
   receiving an radio resource control (RRC) connection reconfiguration message including mobility control information from a master base station and performing a secondary base station change procedure based on the receipt of the RRC connection reconfiguration message;
   after initiating the secondary base station change procedure, controlling data transmission to and/or data reception from a source secondary base station to be maintained until a specific point in time, based on the mobility control information; and
   after the specific point in time passes, transmitting data through a random access channel regarding a random access procedure on a target secondary base station.

2. The method according to claim 1, wherein the mobility control information comprises secondary cell group mobility control information regarding a secondary base station change.

3. The method according to claim 1, wherein the RRC connection reconfiguration message includes information indicating the terminal to maintain an operation of transmitting data to and/or receiving data from the source secondary base station until the specific point in time with regard to the target secondary base station.

4. The method according to claim 1, wherein the specific point in time includes one of a point in time at which an random access channel is transmitted, a point in time at which a random access preamble is transmitted, a point in time at which a random access procedure on a target secondary base station is terminated, a point in time at which an uplink signal is transmitted to the target secondary base station, a point in time at which synchronization with the target secondary base station is established, and a point in time at which radio resources of the target secondary base station are configured.

5. The method according to claim 1, further comprising transmitting terminal capability information to the master base station,
   wherein the terminal capability information comprises information indicating the terminal to be able to maintain an operation of transmitting data to and/or receiving data from the source secondary base station until the specific point in time.

6. A method of performing a mobility control operation of a terminal by a source secondary base station, the method comprising:
   receiving secondary base station release request information from a master base station during a secondary base station change procedure;
   after the receipt of the secondary base station release request information, maintaining an operation of transmitting data to and/or receiving data from a terminal until a specific point in time; and
   releasing terminal context when the specific point in time has passed.

7. The method according to claim 6, wherein the secondary base station release request information comprises information indicating the source secondary base station to maintain the operation of transmitting data to and/or receiving data from the terminal until the specific point in time.

8. The method according to claim 6, further comprising, before releasing the terminal context, receiving indication information from a target secondary base station, indicating the operation of transmitting data to and/or receiving data from the terminal to be terminated.

9. A method of performing a mobility control operation of a terminal by a target secondary base station, the method comprising:
   receiving secondary base station addition request information from a master base station;
   transmitting secondary base station addition request acknowledgement information to the master base station; and
   receiving data through a random access channel regarding a random access procedure from the terminal,
   wherein the secondary base station addition request information comprises terminal capability information,
   the terminal capability information comprising information indicating the terminal to be able to maintain an operation of transmitting data to and/or receiving data from the source secondary base station until a specific point in time.

10. The method according to claim 9, wherein the secondary base station addition request acknowledgement information comprises information indicating the terminal to maintain an operation of transmitting data to and/or receiving data from a source secondary base station until a specific point in time.

11. The method according to claim 9, further comprising, after receiving the random access channel, transmitting indication information to a source secondary base station, indicating the source secondary base station to terminate an operation of transmitting data to and/or receiving data from the terminal.

* * * * *